US012407115B2

(12) United States Patent
Wendt

(10) Patent No.: US 12,407,115 B2
(45) Date of Patent: Sep. 2, 2025

(54) TERMINAL, TOOL FOR CONNECTING AN ELECTRIC CONDUCTOR TO THE TERMINAL, AND METHOD FOR CONNECTING AN ELECTRIC CONDUCTOR TO THE TERMINAL

(71) Applicant: PHOENIX CONTACT GMBH & CO. KG, Blomberg (DE)

(72) Inventor: Andreas Wendt, Berlin (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 356 days.

(21) Appl. No.: 18/043,056

(22) PCT Filed: Sep. 1, 2021

(86) PCT No.: PCT/EP2021/074078

§ 371 (c)(1),
(2) Date: Feb. 27, 2023

(87) PCT Pub. No.: WO2022/053361

PCT Pub. Date: Mar. 17, 2022

(65) Prior Publication Data

US 2023/0361490 A1 Nov. 9, 2023

(30) Foreign Application Priority Data

Sep. 9, 2020 (LU) ........................................ 102037

(51) Int. Cl.
*H01R 12/00* (2006.01)
*H01R 4/2445* (2018.01)
(Continued)

(52) U.S. Cl.
CPC ........... *H01R 4/2445* (2013.01); *H01R 12/53* (2013.01); *H01R 43/28* (2013.01)

(58) Field of Classification Search
CPC ................................ H01R 12/53; H01R 43/28
See application file for complete search history.

(56) References Cited

U.S. PATENT DOCUMENTS 3,805,214 A 4/1974 Demler
3,810,288 A 5/1974 Caveney et al.
(Continued)

FOREIGN PATENT DOCUMENTS

DE 10048298 A1 5/2003
DE 102015121743 A1 6/2017
DE 102016114344 8/2017

*Primary Examiner* — Phuong Chi Thi Nguyen
(74) *Attorney, Agent, or Firm* — LEYDIG, VOIT & MAYER, LTD.

(57) ABSTRACT

A terminal for connecting an electrical conductor with a sheath includes: a first side wall section and a second side wall section, which are arranged opposite one another and/or spaced apart from one another. The first side wall section has a first terminal element and the second side wall section has a second terminal element which are assigned to one another to form a terminal slot and are arranged at least sectionally at a distance from one another. The first side wall section has a cutout in its end face, at which the electrical conductor is guided on the terminal slot for connection to the terminal, which cutout is groove-shaped to at least sectionally receive in the cutout a tool placed on the terminal in a form-fitting manner.

29 Claims, 17 Drawing Sheets

(51) Int. Cl.
*H01R 12/53* (2011.01)
*H01R 43/28* (2006.01)

(56) References Cited

U.S. PATENT DOCUMENTS

| | | | | |
|---|---|---|---|---|
| 4,387,501 | A | 6/1983 | Rix | |
| 4,722,699 | A | 2/1988 | Heng et al. | |
| 5,073,126 | A * | 12/1991 | Kikuchi | H01R 4/245 439/942 |
| 6,152,760 | A * | 11/2000 | Reeser | H01R 4/2433 439/409 |
| 6,419,518 | B1 * | 7/2002 | Dittman | H01R 4/2458 439/401 |
| 6,540,544 | B1 * | 4/2003 | Akeda | H01R 43/01 439/404 |
| 8,251,737 | B2 * | 8/2012 | Van Stiphout | H01R 4/2433 439/404 |
| 10,283,879 | B2 * | 5/2019 | Dendas | H01R 4/2416 |
| 2002/0039855 | A1 | 4/2002 | Olejarz | |
| 2018/0366840 | A1 | 12/2018 | Wendt et al. | |
| 2019/0245311 | A1 | 8/2019 | Wendt | |
| 2023/0361490 | A1 * | 11/2023 | Wendt | H01R 4/2445 |

* cited by examiner 100
101
102
112
AP
103
107
6
8
106
EP
10
1
115
117
2
20
21
22
107
103
106
7
11
9
23

100
115
101
102
103A
117
111
112
103
2
110
107
18
106
106A
16
12
14
3
23
5
7
1

100
115
101
111
117
103A
103
2
110
107
106
106A
14
23
3
18
5
102
112
AP
EP
1

A-A

Z
110
115
116
102
104
101

A-A
115
101
116
107
108
111
Z
106
104
102
107
108
111
112
100

110
103A
115
110
A
103A
117
102
117
102
103A
103A
101
100
A

A-A

Z

Z

B-B

B-B

TERMINAL, TOOL FOR CONNECTING AN ELECTRIC CONDUCTOR TO THE TERMINAL, AND METHOD FOR CONNECTING AN ELECTRIC CONDUCTOR TO THE TERMINAL

CROSS-REFERENCE TO PRIOR APPLICATIONS

This application is a U.S. National Phase application under 35 U.S.C. § 371 of International Application No. PCT/EP2021/074078, filed on Sep. 1, 2021, and claims benefit to Luxembourg Patent Application No. LU 102037, filed on Sep. 9, 2020. The International Application was published in German on Mar. 17, 2022 as WO/2022/053361 under PCT Article 21(2).

FIELD

The invention relates to a terminal for connecting an electrical conductor, and to a tool for producing a connection between an electrical conductor and a terminal. The invention further relates to a method for producing a connection between an electrical conductor and a terminal, and to an arrangement consisting of a terminal and a tool.

BACKGROUND

Insulation displacement connections (IDC) are known from the prior art. Thereby, an electrical contact is frequently formed by inserting or pressing electrical conductors into a fork-like elastic insulation piercing connector. The insulation of the electrical conductor is severed, and the metallic, electrically conductive inner conductor is clamped in order to contact the insulation piercing connector.

There are in different designs of insulation piercing connectors, for example with single or double clamping. The insulation piercing connector must always be adapted to and selected for to the provided conductor type and its insulating material. For example, this allows stranded conductors, solid conductors and enameled wire conductors with a cross-section from approximately 0.01 $mm^2$ (enameled wire) to approximately 6 $mm^2$ to be contacted. Furthermore, corresponding tools for producing a connection of electrical conductors to terminals are known from the prior art. Another problem is that, especially in the case of electrical conductors of larger cross-section, correspondingly higher forces must be applied to connect the electrical conductor to the terminal. In so doing, arising mechanical loads can be undesirably transferred to, for example, printed circuit boards or circuit boards to which the terminal is attached, and/or can even damage the latter.

For example, document DE 10 2015 121 743 A1 describes a tool for connecting an electrical conductor, which is encased with insulation, to an insulation piercing connector. Located within the tool is a plunger element for guiding and a cutting region for cutting the insulation of the electrical conductor before the electrical conductor is inserted into the terminal slot of the insulation piercing connector. The tool is equipped with pivotable holding means for holding engagement with the insulation piercing connector in a tool contact position.

From document U.S. Pat. No. 3,805,214 A, a gun-like tool for connecting an insulated electrical conductor to an electrical connector in the form of a terminal is known. The tool has a displaceable plunger with a pin for inserting the electrical conductor into the terminal, which pin actuates elastically resilient gripping elements for holding and releasing the terminal by means of corresponding outer edges and surfaces.

Document DE 10 2016 114 344 B3 discloses a lever tool for connecting an electrical conductor, which is encased with insulation, to an insulation piercing connector, wherein the lever tool has, on the one hand, a punch element with pressure sections for the electrical conductor and a guide element and, on the other hand, a counter-support element for holding the insulation piercing connector. The guide element engages in a form fit in a guide recess in the insulation piercing connector.

Document DE 100 48 298 A1 discloses a conductor connection element for connecting an electrical conductor to an insulation piercing connector. The conductor connection element has a connection body with two U-shaped conductor receiving chambers and an overmolded part with a thread for actuating a screw-on clamping screw in order to press the electrical conductor into the insulation piercing connector, which is arranged on the side of the conductor receiving chambers by means of a pin.

SUMMARY

In an embodiment, the present invention provides a terminal for connecting an electrical conductor with a sheath, the terminal comprising: a first side wall section and a second side wall section, which are arranged opposite one another and/or spaced apart from one another, wherein the first side wall section has a first terminal element and the second side wall section has a second terminal element which are assigned to one another to form a terminal slot and are arranged at least sectionally at a distance from one another, and wherein the first side wall section has a cutout in its end face, at which the electrical conductor is guided on the terminal slot for connection to the terminal, which cutout is groove-shaped to at least sectionally receive in the cutout a tool placed on the terminal in a form-fitting manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1B:
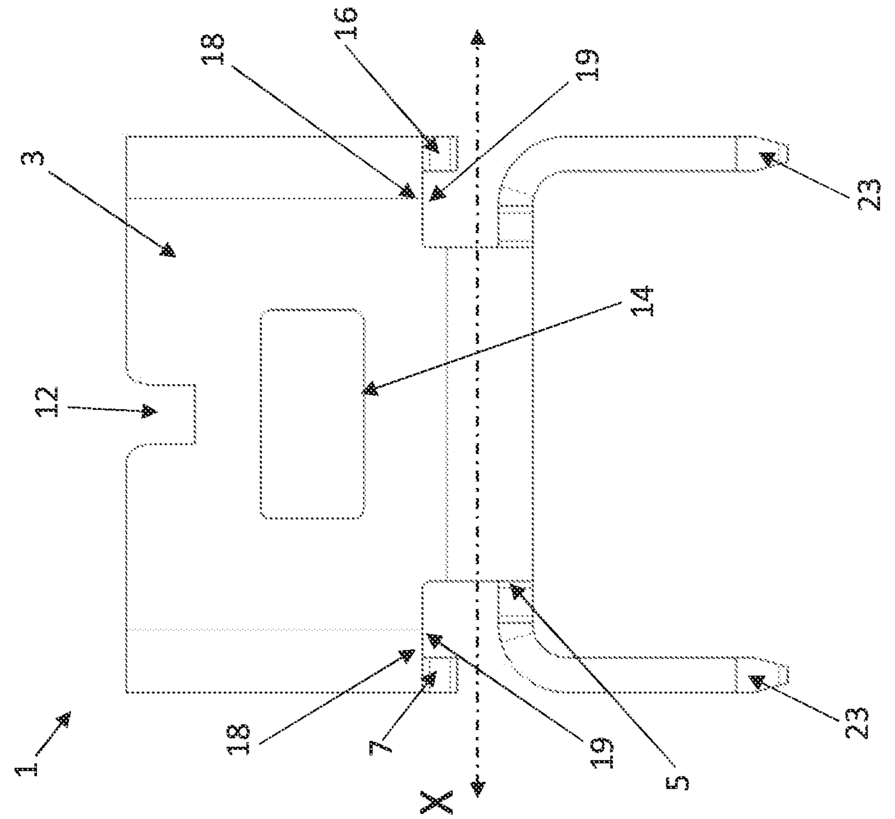
FIG. 1B, a side view of the exemplary embodiment of the terminal shown in FIG. 1A.

In an embodiment, the present invention provides an improved terminal, an improved tool and an improved method for connecting an electrical conductor to a terminal.

According to a first general aspect, the invention relates to a terminal for connecting an electrical conductor with a sheath, wherein the terminal comprises a first side wall section which preferably extends in the direction of the electrical conductor that is or is to be connected, and a second side wall section, which are arranged opposite one another and/or spaced apart from one another, wherein the first side wall section has a first terminal element and the second side wall section has a second terminal element, which are assigned to one another in order to form a terminal slot, and are arranged at least sectionally at a distance from one another, wherein the first side wall section has a cutout or recess in its end face, and preferably the second side wall section has a cutout or recess in its end face at which the electrical conductor is guided or attached to the terminal slot for connection to the terminal, which cutout or recess is groove-shaped in order to at least sectionally receive or bear a tool placed on the terminal, or a tool contacting the terminal, in the cutout in a formfitting manner.

The terminal can preferably be designed as an insulation piercing connector, or as a so-called edge connector.

The connection can preferably comprise the formation of an electrically conductive connection between the terminal and the electrical conductor. The electrical conductor can preferably be an insulated electrical conductor or an electrical conductor sheathed with at least one insulating material.

The first side wall section and/or the second side wall section can preferably be designed as a metallic spring, for example as a leaf spring. In other words, the terminal can be designed as a double spring terminal. The first side wall section and the second side wall section can preferably be spaced apart from one another by a common bar.

The terminal slot can preferably be designed to receive an electrical conductor. The first terminal element can preferably contact the second terminal element at least sectionally in the region of the terminal slot, for example via a projection.

With the terminal according to the invention, an operative connection can be provided with a correspondingly designed and/or formed tool, or an operative connection can be provided which ensures a mounting or bearing function of the tool on the terminal in the axial direction, that is to say in the direction of the electrical conductor that is connected or to be connected.

According to a further aspect of the invention, it can be provided that the cutout extends along the wall thickness of the first side wall section and/or along the wall thickness of the second side wall section, preferably substantially perpendicular to the direction of the electrical conductor that is connected or to be connected.

Preferably, a groove can be formed in the end face, i.e. in the region of the end faces of the first and/or the second side wall section.

The terminal therefore requires, for example, no further machining operations for creating receiving regions or bearing regions for a tool to be mounted or applied.

According to a further aspect of the invention, it can be provided that the cutout in the first and/or in the second side wall section has, in a view, preferably in a side view of the terminal, at least sectionally, a substantially funnel-shaped contour and/or a substantially arcuate and/or substantially round contour.

As a result, for example, a more or less defined guide for a corresponding section of a tool for applying or placing the tool on the terminal can be ensured.

It is also possible for the cutout to be at least sectionally wedge-shaped.

According to a further aspect of the invention, it can be provided that the cutout in the first side wall section is arranged centered or centrally in relation to the first side wall section, and/or the cutout in the second side wall section is arranged centered or centrally in relation to the second side wall section.

In this way, for example, improved mechanical behavior, preferably elastic behavior, of the terminal with regard to spring action can be achieved.

Preferably, the contours of the cutouts in the first and second side wall sections overlap in a view, preferably in a side view of the terminal.

The tool can therefore also be placed on the terminal or put on the terminal rotated by 180°, for example. This enables, for example, a further simplified assembly process.

According to a further aspect of the invention, provision can be made for the first terminal element and the second terminal element to form at least one connection section for connecting the electrical conductor, wherein the at least one connection section has a substantially round or annular contour or a substantially oval or curved contour in a view, preferably in a side view in the direction of the electrical conductor that is connected or to be connected.

The at least one connection section can preferably be formed and/or arranged within the terminal slot of the terminal, preferably bordered on one side by at least one projection of the first and/or second terminal element.

As a result, for example for the connection to the terminal, electrical conductors of different sizes, i.e. different diameters, can be accommodated at least sectionally for the reception or contacting.

The first terminal element can be formed at least sectionally substantially identically and/or substantially symmetrically to the second terminal element.

An arrangement of terminal surfaces facing each other in the form of end faces of the first terminal element and the second terminal element, preferably for forming at least one connection section, enables with such a configuration e.g. a clamping force or pressing force relative to the electrical conductor at a corresponding height.

According to a further aspect of the invention, it can be provided that the terminal slot has, in a view, preferably in a side view in the direction of the electrical conductor that is connected or to be connected, at least sectionally, a substantially V-shaped contour which preferably merges into the contour of the at least one connection section.

As a result, for example, the reception or the guidance of the electrical conductor in or within the terminal slot can be further improved. Due to such a path for the electrical conductor defined by the terminal, for example additional elements or components on the tool for guiding the electrical conductor are dispensable.

According to a further aspect of the invention, it can be provided that the first side wall section and the second side wall section are connected to one another via a common bar, and preferably the first side wall section, the second side wall section and the bar are formed substantially U-shaped in a view, preferably in a sectional view in the direction of the electrical conductor that is connected or to be connected.

It is possible for the first side wall section, and/or the first terminal element, and/or the second side wall section, and/or the second terminal element to be designed at least sectionally plate-shaped and/or flat.

This allows, for example, a weight reduction of the terminal to be achieved without mechanical properties such as stiffness or stability deteriorating significantly.

According to a further aspect of the invention, it can be provided that the first side wall section comprises a further first terminal element and the second side wall section comprises a further second terminal element, which are assigned to one another to form a further terminal slot and are arranged at least sectionally spaced apart from one another.

As a result, for example, the electrical conductor can be connected to the terminal at two connection sections that are spaced apart from one another which, for example, results in optimized electrical contacting.

It is possible for the further first terminal element to contact the further second terminal element at least sectionally in order to form an operative connection between the further first terminal element and the further second terminal element.

The further first terminal element can additionally be formed at least sectionally substantially identically and/or symmetrically to the further second terminal element.

According to a further aspect of the invention, provision can be made for the first side wall section and/or the second side wall section to have at least one retaining element to form an operative connection with a tool applied to or placed on the terminal on an end face opposite the end face with the cutout.

The at least one retaining element can be designed, for example, as a projection or as a cutout, i.e. recess.

The operative connection can preferably have, at least sectionally, a form-fitting connection and/or at least sectionally a frictional connection, such as for example a clamping connection, in order to preferably generate a closed flow of force at least sectionally within the tool and the terminal.

In other words, the at least one retaining element can be designed such that a tool, preferably a gripping element or locking element of the tool, can be attached thereto.

According to a further aspect of the invention, it can be provided that the terminal is formed from a metallic material, preferably integrally, preferably by at least one bending process and/or punching process.

As a result, for example, the terminal can be produced cost-effectively.

A second general aspect of the invention relates to a tool, preferably an insertion tool, for producing a connection, that is to say to connect an electrical conductor with a sheath to a terminal with at least one retaining element and at least one groove-shaped cutout in an end face on which the electrical conductor is guided or placed on the terminal slot of the terminal for connecting to the terminal, preferably to a terminal as disclosed herein, wherein the tool comprises a guide frame which is configured and/or formed at least sectionally for the contacting or connection of the terminal, preferably the at least one cutout, and a slide unit which is movably mounted on the guide frame for guiding the electrical conductor into the terminal, preferably into the terminal slot of the terminal, wherein the guide frame has at least one locking element which is pivotably mounted, and the slide unit for actuating the at least one locking element is displaceably coupled to or with the at least one locking element in order to bring the at least one locking element into engagement with the at least one retaining element of the terminal at least sectionally during the guidance of the electrical conductor into the terminal, preferably within the terminal.

The tool can preferably be configured and/or designed for applying and/or connecting an electrical conductor to a terminal. The electrical conductor can be designed as a sheathed conductor in the form of an electrical conductor with a sheath. The slide unit can preferably be mounted in a translationally displaceable manner.

The terminal can be contacted by the tool at least sectionally in a form-fitting manner.

As a result, a tool is provided, for example, which avoids mechanical loads on carrier materials or carrier structures of a terminal, such as, for example, circuit boards or printed circuit boards, when connecting an electrical conductor to the terminal, or at least keeps them as small as possible. Mechanical loads, for example in the form of forces, preferably occur predominantly only within the tool, the electrical conductor and the terminal.

According to a further aspect of the invention, it can be provided that the guide frame has at least one substantially spring-shaped or substantially pin-like section, preferably a projection, in the contact region for at least sectionally contacting the terminal, preferably the at least one groove-shaped cutout.

As a result, a form-fitting tongue-and-groove connection can be formed, for example, at least sectionally.

The substantially spring-shaped or substantially pin-like projection can be at least sectionally rounded and/or chamfered, for example.

It is possible for the guide frame to have at least one cutting element in order to cut the sheath of the electrical conductor at least sectionally and preferably before guiding the electrical conductor into the terminal or within the terminal, preferably by the slide unit, wherein the at least one cutting element is preferably mounted releasably and/or pivotably.

In a preferred embodiment, the guide frame can have four cutting elements. Preferably, for example, at least preliminary cutting of the electrical conductor can be performed by the at least one cutting element. The at least one cutting element can be replaced by a detachable bearing, for example, and/or can be replaced by at least one cutting element of a different configuration and/or design. As a result, for example, the cutting depth and/or the cutting angle in the electrical conductor can be varied. Furthermore, for example, this allows the tool to be adapted to different electrical conductors.

According to a further aspect of the invention, it can be provided that the at least one cutting element can be mounted or plugged onto a bearing pin, wherein at least one cutout in the at least one cutting element receives a projection of the guide frame which sectionally supports the bearing pin.

The cutout in the at least one cutting element can preferably contact or abut the projection of the guide frame at least sectionally.

As a result, for example, axial displaceability of the at least one cutting element in the direction of the bearing pin can be prevented.

The bearing pin can be cylindrical, for example, at least sectionally.

It is possible for the at least one cutting element to be configured and/or designed, preferably at least sectionally configured and/or designed wedge-shaped or pyramid-shaped to push the sheath of the electrical conductor apart at the cut location or at the cut region, preferably to press it apart.

The cut location or the cut region can preferably form the electrical contact point or the electrical contact region for forming the connection of the electrical conductor to the terminal, that is to say to one of the connection sections of the terminal.

In other words, the electrical conductors which are stripped in places or in regions can thereby preferably be prepared for being guided or inserted into the terminal slot of the terminal. The insulation of the electrical conductor can preferably be pushed apart or pressed apart at least as far as the at least one terminal slot of the terminal is wide.

According to a further aspect of the invention, it can be provided that the at least one cutting element is acted upon by pretension, preferably by a spiral spring, and/or is adjustably arranged or designed, preferably by means of a screw connection.

Preferably, the coil spring can move or return the at least one cutting element into a defined initial position.

The coil spring can preferably be arranged on the bearing pin on which the at least one cutting element is releasably and/or pivotably mounted, and/or is arranged or supported on the projection of the guide frame.

The adjustability of the at least one cutting element by preferably a screw connection can preferably comprise the cutting depth and/or the cutting angle. Therefore, for example, different electrical conductors, i.e. electrical conductors of different sizes, can be processed with the tool.

The screw connection can preferably contact a stop of the guide frame.

According to a further aspect of the invention, it can be provided that the slide unit is mounted displaceably on the guide frame by means of a slotted guide, wherein preferably two slot tracks are arranged or formed on the guide frame, and two sliding blocks are arranged or formed on the slide unit.

The sliding blocks can preferably be received in a form-fitting manner at least sectionally in the slot tracks.

It is possible for the slide unit to comprise at least one stop element, preferably designed as a stop buffer, for contacting the terminal, and preferably for the at least one stop element to be adjustable in its position relative to the slide unit.

As a result, the path of the slide unit can be set, for example, and the guidance of the electrical conductor into the terminal is thereby ensured from an initial position into a definable end position, i.e., the connection position.

According to a further aspect of the invention, it can be provided that the at least one stop element comprises a screw connection, wherein preferably a threaded screw or threaded spindle with a stop buffer is provided to at least sectionally contact the terminal, preferably in a connection position of the electrical conductor to the terminal.

According to a further aspect of the invention, it can be provided that the guide frame has at least one shoulder, preferably at least one fold, which forms a stop in the contact region or holding region for at least sectionally contacting the terminal, in order to preferably prevent plastic deformation of the terminal during the connection of the electrical conductor to the terminal.

This allows, for example, excessive bending of the terminal to be prevented.

It is possible for the at least one shoulder of the guide frame to have a chamfer or a rounding at least sectionally in the contact region or holding region.

According to a further aspect of the invention, it can be provided that the at least one locking element, preferably in the contact region or holding region, has a hook section for at least sectionally contacting the terminal in order to at least sectionally grasp around the terminal on the at least one retaining element, wherein preferably the hook section at least sectionally has a chamfer or a rounding.

This ensures, for example, easy and accurate reception of the terminal to hold the terminal by the at least one locking element.

According to a further aspect of the invention, it can be provided that the slide unit comprises an actuating element by which the slide unit is coupled to or with the at least one locking element, wherein the actuating element is preferably at least sectionally cylindrical or pin-shaped and/or forms a plain bearing connection with the at least one locking element, preferably a sliding surface of the at least one locking element.

According to a further aspect of the invention, it can be provided that the pivot axis of the at least one cutting element and the pivot axis of the at least one locking element lie substantially perpendicular to one another or are arranged perpendicular to one another in a view, preferably in a plan view.

In addition, the first/additional first terminal element and/or the second/additional second terminal element can be formed at least sectionally as a cutting element, and each preferably have a cutting edge, at least sectionally, in order to be able to carry out further cutting of the electrical conductor by the first/additional first terminal element and/or the second/additional second terminal element.

A third general aspect of the invention relates to a method for establishing a connection between an electrical conductor with a sheath and a terminal with at least one terminal slot, at least one retaining element and at least one groove-shaped cutout in an end face on which the electrical conductor is guided or placed at the terminal slot of the terminal for connecting to the terminal. The terminal can preferably be designed as disclosed herein. The method can preferably be carried out using a tool as disclosed herein. The tool can, for example, be operated manually or can also be arranged on a robot arm to automatically produce the connection.

The method comprises:

Placing or applying the tool on the terminal, preferably on end faces of at least two opposite side wall sections of the terminal spaced apart from the at least one terminal slot, which each have the at least one groove-shaped cutout;

At least sectionally forming a form-fitting, preferably releasable connection between the at least one cutout and the tool, preferably a spring-like or pin-like section of the tool;

Inserting the electrical conductor into the tool;

Attaching at least one pivotably mounted locking element of the tool to the terminal, preferably to the at least one retaining element, by means of the slide unit, and holding the terminal preferably by the at least one pivotably mounted locking element;

Guiding the electrical conductor to and/or at least sectionally into the region of the at least one terminal slot by means of a slide unit of the tool;

Guiding, preferably pressing or pushing, the electrical conductor into the region of a connection section of the at least one terminal slot, and establishing the connection between the electrical conductor and the terminal.

The attachment of at least one pivotably mounted locking element of the tool to the terminal can additionally comprise, for example: Forming a force flow, preferably a closed force flow, between the terminal, the electrical conductor and the tool, preferably the at least one pivotably mounted locking element.

Guiding, preferably pressing or pushing the electrical conductor into the region of a connection section of the at least one terminal slot can further preferably include, at least sectionally and/or at least temporarily, widening or folding open the terminal.

According to a further aspect of the invention, it can be provided that the method further comprises: Guiding the electrical conductor to at least one cutting element of the tool by means of the slide unit;

At least sectionally cutting the sheath of the electrical conductor at a point to be connected to the terminal or a region to be connected to the terminal by means of the at least one cutting element;

The cutting can preferably comprise severing the insulation at the point to be contacted or at the region to be contacted down to at least one wire. Preferably, the cutting of the insulation of the electrical conductor can occur at a time in which the at least one pivotably mounted locking element already holds or contacts the terminal, preferably on the at least one retaining element of the terminal.

According to a further aspect of the invention, it can be provided that the method further comprises: Pushing apart or pressing apart the sheath of the electrical conductor at the at least sectionally cut point or the at least sectionally cut region by means of the at least one cutting element.

In so doing, the sheath can be pushed apart or pressed apart as far as the at least one terminal slot of the terminal is wide.

A fourth general aspect of the invention relates to an arrangement comprising a terminal as disclosed herein and a tool as disclosed herein.

To avoid repetition, features directed purely toward the device of the tool according to the invention and/or disclosed in conjunction therewith should also be considered to be disclosed and be able to be claimed in accordance with the method and vice versa.

Identical or functionally equivalent components or elements are denoted by the same reference signs in Figures. For the explanation thereof, reference is also made in part to the description of other exemplary embodiments and/or Figures in order to avoid repetitions.

The following detailed description of the exemplary embodiments illustrated in the figures serves for more detailed illustration or clarification and is not intended to limit the scope of the invention in any way.

Figure 1A:
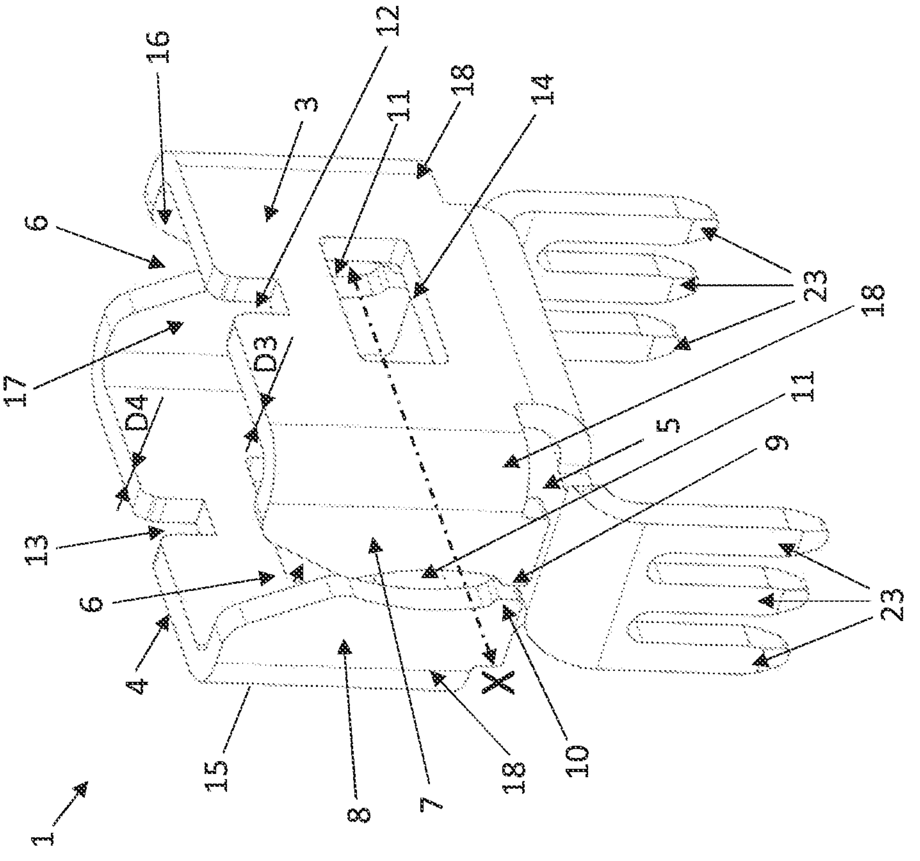
FIG. 1A, a perspective view of an exemplary embodiment of the terminal.

FIG. 1A shows a perspective view of an exemplary embodiment of the terminal 1 for connecting an electrical conductor 2 with a sheath 20, that is to say for connecting a sheathed electrical conductor 2 (see for example FIG. 4A to 5C).

The terminal 1 comprises a bar 5, which is plate-shaped. Components and elements of the terminal 1, which are described in more detail below, are arranged or formed on the bar 5.

A fastening plug 23 in the form of soldering pins is arranged or preferably integrally formed on the bar 5. The fastening plugs 23 serve to attach or fasten the terminal 1 to, for example, a printed circuit board, circuit board or printed circuit card.

Furthermore, the bar 5 comprises a first side wall section 3 and a second side wall section 4. The first side wall section 3 is arranged at a distance across the bar 5 from the second side wall section 4. In addition, the first side wall section 3 is arranged opposite the second side wall section 4.

The first side wall section 3 and the second side wall section 4 are substantially mirror-symmetrical to one another. The first side wall section 3 and the second side wall section 4 extend in the direction of the electrical conductor 2 that is connected or is to be connected (double arrow labeled "X"). The first side wall section 3 and the second side wall section 4 are preferably designed as resilient or preferably spring-elastic elements in the form of metal springs and therefore have a certain elasticity.

The first side wall section 3 has an integrally formed first terminal element 7 and an integrally formed further first terminal element 16 on an outer side, i.e. an end face, in the direction of the electrical conductor 2 that is connected or to be connected. The second side wall section 4 has an integrally formed second terminal element 17 and an integrally formed further second terminal element 8 on an outer side, i.e. an end face, in the direction of the electrical conductor 2 that is connected or to be connected.

The first terminal element 7 and the second terminal element 8 are formed and/or arranged at least sectionally in a substantially mirror-symmetrical manner relative to one another. The further first terminal element 16 and the further second terminal element 17 are formed and/or arranged at least sectionally in a substantially mirror-symmetrical manner relative to one another. The further first terminal element 16 and the further second terminal element 17 are configured and/or formed corresponding to the first terminal element 16 and the second terminal element 17.

The first terminal element 7 and the second terminal element 8 and the further first terminal element 16 and the further second terminal element 17 are at least sectionally arranged spaced apart from one another by the first side wall section 3 and the second side wall section 4 and therefore each form a terminal slot 6. The terminal slot 6 serves to receive and/or connect the electrical conductor 2 and will be explained in more detail below.

The first terminal element 7 and the second terminal element 8 are configured and/or formed and arranged relative to each other such that they form a connection section 11 for connecting the electrical conductor 2 to the terminal 1. The further first terminal element 16 and the further second terminal element 17 are also configured and/or formed and arranged relative to each other in such a way that they form a (further) connection section 11 (not visible in the figures) for connecting the electrical conductor 2 to the terminal 1. Preferably, the electrical conductor 2 remains in the connection sections 11 when the electrical conductor 2 is in the connected state.

Furthermore, the terminal 1 shown in FIG. 1A comprises retaining elements 18 in the form of integrally formed wall sections which are each located between the first side wall section 3 and the first terminal element 7 and the further first terminal element 16, and between the second side wall section 4 and the second terminal element 8 and the further second terminal element 17. Alternatively, the retaining elements 18 can also be designed as projecting or protruding projections, for example. The retaining elements 18 serve for at least sectionally forming a form-fitting connection to a tool 100 (see the further FIG. 2A to 14C) in order to hold the terminal 1 on the tool 100 to form a flow of force, preferably during the connection of the electrical conductor 2 to the terminal 1. Each wall section of a retaining element 18 preferably has a contact surface 19 (see in particular the further FIGS. 1B and 1C).

On the end face of the first side wall section 3 and the second side wall section 4, i.e. the side on which the electrical conductor 2 is guided on or placed in the terminal slot 6 for connection to the terminal 1, the first side wall section 3 and the second side wall section 4 each comprise a cutout 12, 13. The cutouts 12, 13 are groove-shaped in order to at least sectionally receive, in a form-fitting manner within the cutout 12 13, a tool 100 applied to the terminal 1 or making contact with the terminal 1. The cutout 12 in the first side wall section 3 and the cutout 13 in the second side wall section 4 are substantially symmetrical and/or identical to one another.

The cutout 12 extends along the wall thickness D3 of the first side wall section 3, and the cutout 13 extends along the wall thickness D4 of the second side wall section 4. The transition of the cutout 12 into the corresponding end faces of the first side wall section 3 is formed with rounded sections. The transition of the cutout 13 into the corresponding end faces of the second side wall section 4 is formed with rounded sections. As a result, for example, a suitably designed tool 100 with a spring-shaped or pin-shaped projection 113 (see for example FIG. 10B) can be used to easily produce an at least sectionally form-fitting connection between the tool 100 and the terminal 1. In other words, forming such a tongue-and-groove connection 12, 113 ensures a defined and simplified guiding, preferably positioning, of the tool 100 on the terminal 1.

The cutout 12 and the cutout 13 are arranged centrally or centered with respect to the first side wall section 3 and the second side wall section 4. As a result, together with a preferably more or less symmetrical design of the terminal 1, the tool 100 can also be placed on the terminal 1 rotated by 180° in order to guide the electrical conductor 2 for connection to the terminal 1 into the terminal 1, i.e. into the terminal slots 6 of the terminal 1.

Furthermore, the first side wall section 3 has a cutout 14 which is rectangular in cross-section, and the second side wall section 4 has a cutout 15 which is rectangular in cross-section.

The first terminal element 7 and the second terminal element 8, and analogously the further first terminal element 16 and the further second terminal element 17, also each have a projection 9, 10 in order to form a stop and therefore a limit for the electrical conductor 2 in the terminal 1.

As already briefly mentioned above, the double arrow marked with "X" indicates the direction or extension and therefore the position of the electrical conductor 2 that is connected or to be connected in or on the terminal 1, preferably in the connection sections 11.

FIG. 1B shows a side view of the embodiment of the terminal 1 shown in FIG. 1A.

It can be seen from this that the first terminal element 7 and the further first terminal element 16 are connected to the first side wall section 3 via the wall sections of the retaining elements 18, and are preferably integrally connected to one another. On the end face directed toward the bar 5, the wall sections of the retaining elements 18 preferably have contact surfaces 19 for a tool 100 to be attached to the terminal 1, which is described in more detail below.

Furthermore, FIG. 1B shows that the cutout 12 (and the cutout 13) in this view has a funnel-shaped contour.

Figure 1D:
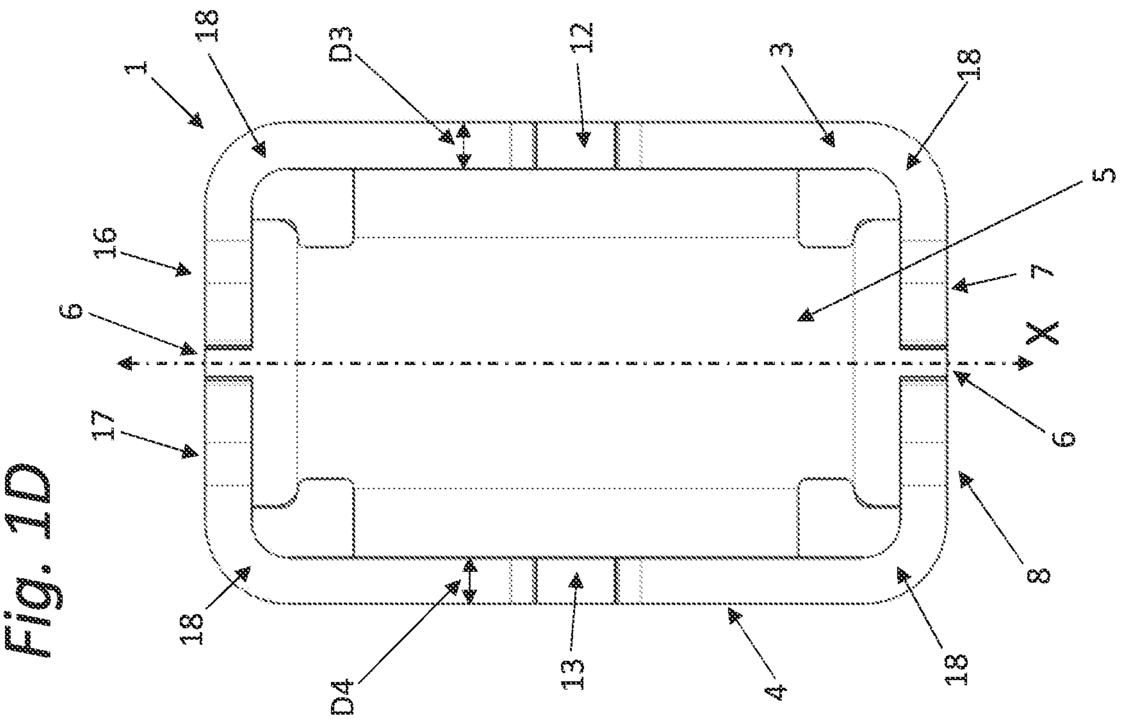
FIG. 1D, a plan view of the exemplary embodiment of the terminal shown in FIG. 1A.
Figure 1C:
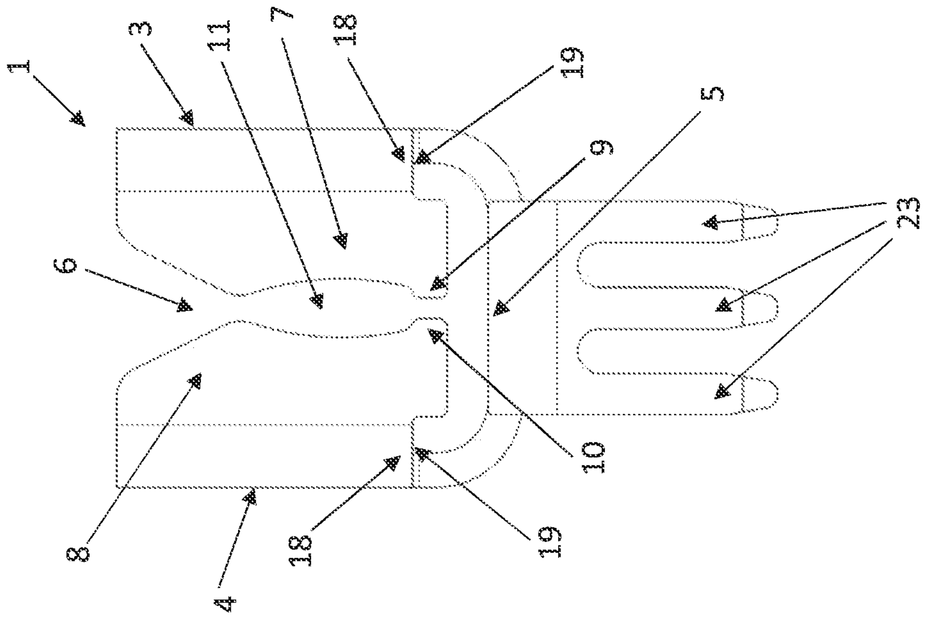
FIG. 1C, a front view of the exemplary embodiment of the terminal shown in FIG. 1A.

FIG. 1C shows a front view of the embodiment of the terminal 1 shown in FIGS. 1A and 1B.

In the front view shown in FIG. 1C, the terminal slot 6 has a substantially V-shaped contour at least sectionally, that is to say in the entry region of the terminal slot 6.

It is possible for the terminal 1, that is to say the first terminal element 7 and/or the second terminal element 8, to comprise, at least sectionally, a cutting edge in the region of the substantially V-shaped contour to further cut the electrical conductor 2 at least sectionally. This can also apply to the further first terminal element 16 and/or the further second terminal element 17.

The connection section 11 for connecting the electrical conductor 2 to the terminal 1 has a substantially oval or curved contour in the view shown in FIG. 1C. As a result, for example, electrical conductors 2 of different sizes, that is to say different diameters, can be accommodated in the terminal 1 and connected to the terminal 1.

The terminal slot 6 of the terminal 1 is designed to receive or connect an electrical conductor 2 to the terminal 1 through the first terminal element 7 and the second terminal element 8 as well as the further first terminal element 16 and the further second terminal element 17 only from one direction, that is to say open or accessible at one end. In other words, the electrical conductor 2 can only be guided into the terminal 1 over the substantially V-shaped section of the terminal slot 6.

As already explained, the further first terminal element 16 and the further second terminal element 17 form a connection section 11, analogously to the first terminal element 7 and the second terminal element 8, and therefore a second connection region for the electrical conductor 2 to the terminal 1.

FIG. 1D shows a plan view of the exemplary embodiment of the terminal 1 shown in FIG. 1A to 1C.

In this view, the terminal 1 has a substantially rectangular contour with rounded corners.

Furthermore, the terminal slots 6 formed by the terminal elements 7 and 8 and 16 and 17 and the bar 5 of the terminal 1 are clearly visible.

Figures 2A, 2B, 2C:
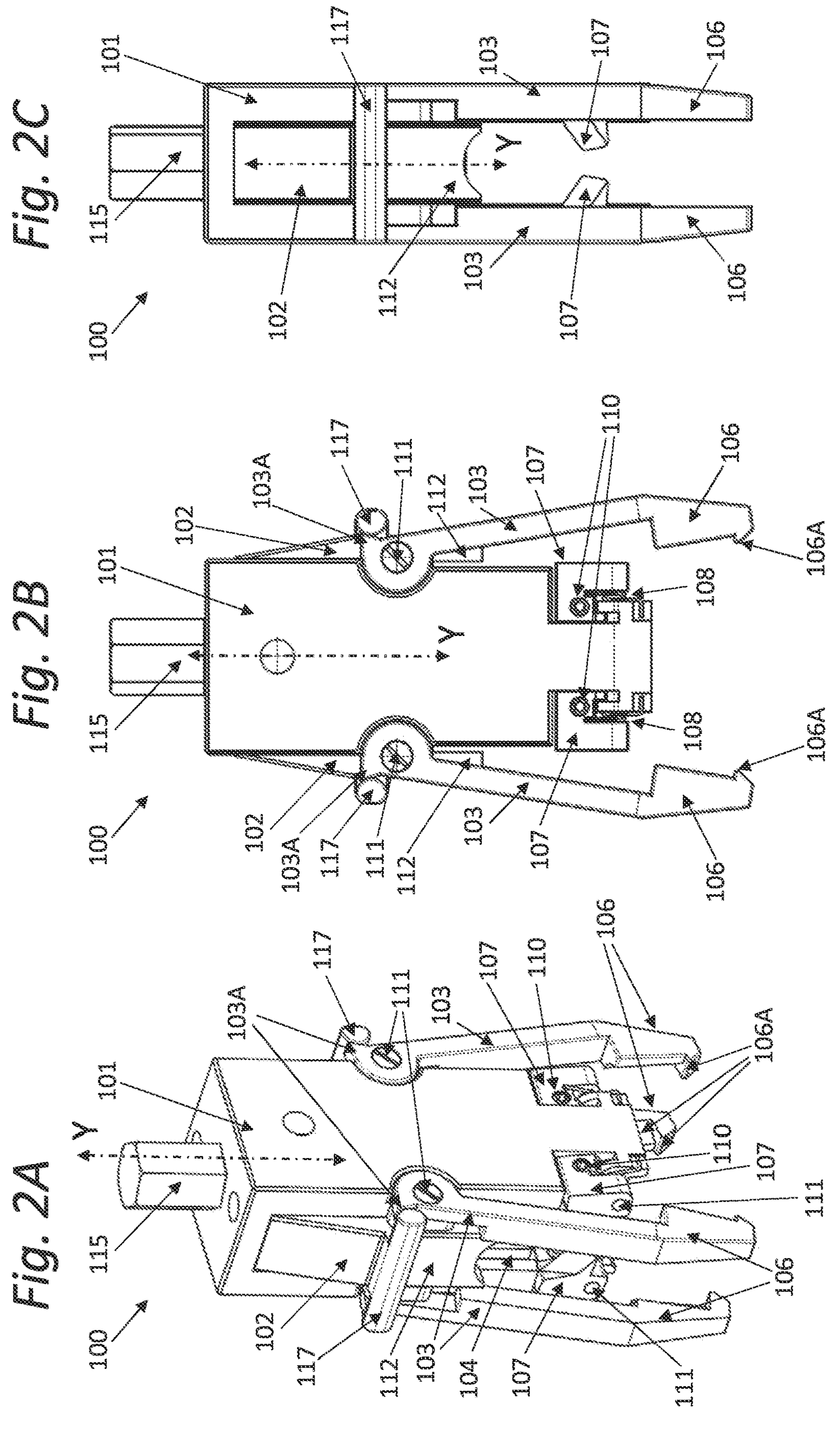
FIG. 2A, a perspective view of an exemplary embodiment of the tool.
FIG. 2B, a side view of the exemplary embodiment of the tool shown in FIG. 2A.
FIG. 2C, a front view of the exemplary embodiment of the tool shown in FIG. 2A.

FIG. 2A shows a perspective view of an exemplary embodiment of the tool 100 for producing a connection between an electrical conductor 2 with the sheath 20 (see, for example, FIG. 4C) and a terminal 1 (not shown in FIG. 2A).

The tool 100 can be configured and/or designed for example as a manually operated tool 100 or as a tool 100 operated by a robot.

The tool 100 comprises a guide frame 101. The guide frame 101 has a U-shaped design with a bar region and opposite leg regions. A slide unit 102 is located within the guide frame 101. The slide unit 102 is mounted movably, preferably translationally movably, on the guide frame 101 for guiding the electrical conductor 2 into the terminal 1. The slide unit 102 is actuated by a plunger element 115, which is designed to be cylindrical. The plunger element 115 is operatively connected to the slide unit 102 via a through-hole in the bar region of the guide frame 101. The direction of movement of the slide unit 102 on the tool 100 is identified with a double arrow marked with “Y”.

A total of four locking elements 103 are pivotably and preferably releasably mounted on the guide frame 101, that is to say the leg regions of the guide frame 101. The bearing is accomplished by means of correspondingly designed bearing pins 111. The bearing pins 111 receive bearing sections of the locking elements 103 in order to preferably form plain bearing connections. The locking elements 103 can preferably be secured to the bearing pins 111 against displacement in the axial direction, i.e. in the direction of the bearing pins 111, and therefore against loosening from the bearing pins 111, for example by means of a screw connection arranged or formed in each case on the end face of the bearing pins 111.

The locking elements 103 are designed in the form of a lever or gripping arm. The locking elements 103 each have a hook section 106 at the end which is opposite the bearing by means of bearing pins 111. The hook section 106 is designed, at least sectionally, according to the configuration and/or design of the terminal 1 in order to ensure a form-fitting connection to the terminal 1, preferably during the connection of the electrical conductor 2 to the terminal 1.

Figure 12B:
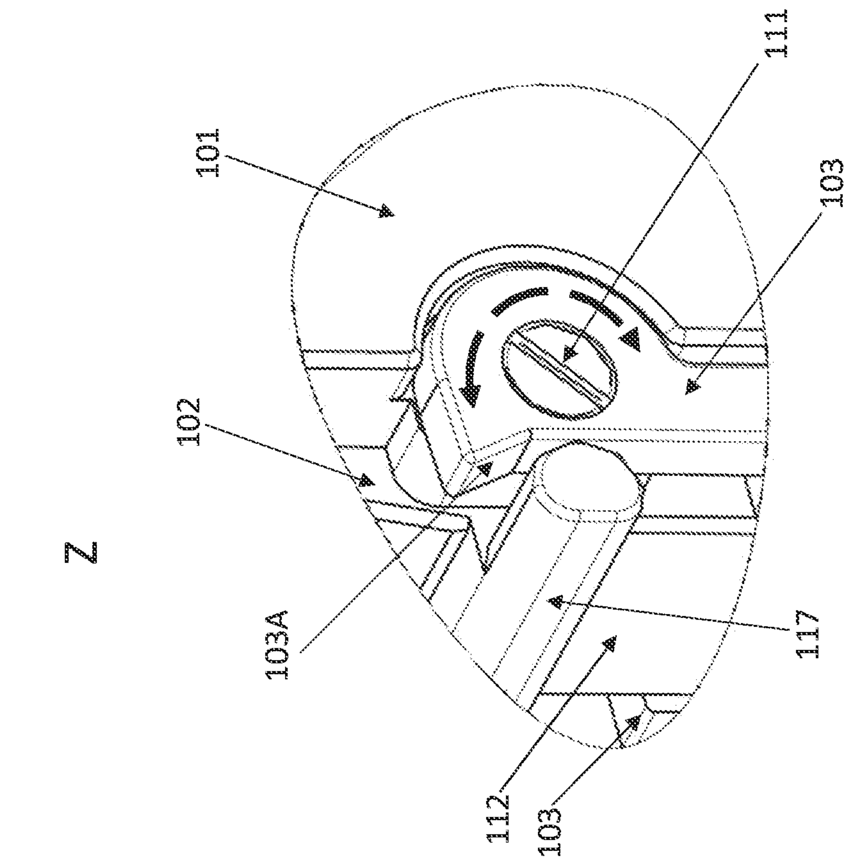
FIG. 12B, an enlarged region of the exemplary embodiment of the tool with a terminal shown in FIG. 12A.
Figure 12A:
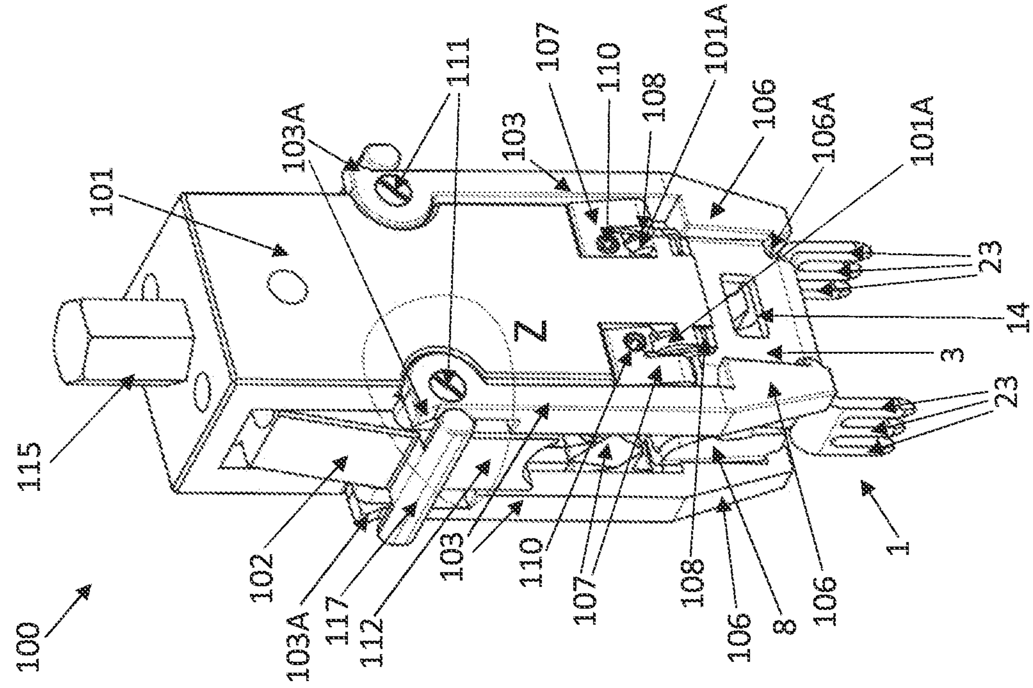
FIG. 12A, a perspective view of the exemplary embodiment of the tool with a terminal shown in FIG. 3A.

On the bearing sections of the locking elements 103, projections 103A which extend obliquely at least sectionally are provided with corresponding working surfaces, which are located outside the pivot axis of the locking elements 103 in order to be able to actuate them by the slide unit 102 (see in this regard preferably FIGS. 12A and 12B). Furthermore, the locking elements 103 have, at least sectionally, sliding surfaces along their lever-shaped extension.

The slide unit 102 is coupled in each case to one side of the tool 100 or to two locking elements 103 in order to actuate the latter. The coupling is performed by actuating elements 117 of the slide unit 117 in a cylindrical design, which preferably contact the abovementioned surfaces of the locking elements 103 and therefore cause a pivoting movement of the locking elements 103 about the respective bearing pins 111 by moving the slide unit 102. Another description can be found in the following with reference to FIGS. 12A and 12B.

Furthermore, the tool 100 shown in FIG. 2A comprises cutting elements 107 pivotably mounted on the guide frame 101, which are explained in more detail below with reference to additional figures.

FIG. 2B shows a side view of the exemplary embodiment of the tool 100 shown in FIG. 2A.

The locking elements 103 are shown in an unfolded state, that is to say pivoted outwards away from the guide frame 101. The actuating elements 117 of the slide unit 102 contact respective projections 103A of the locking elements 103. The slide unit 102 is in a starting position.

The contact region of the tool 100 can be clearly seen for at least sectionally contacting the terminal 1 with the pivotably mounted cutting elements 107.

FIG. 2C shows a front view of the exemplary embodiment of the tool 100 shown in FIG. 2A.

In order to guide the electrical conductor 2 into the terminal 1, the slide unit 102 comprises a conductor guide section 112 on the corresponding side facing the terminal 1. The conductor guide section 112 is designed to be curved for at least sectional contact with the electrical conductor 2, which is clear from the front view in FIG. 2C.

Furthermore, the leg regions of the U-shaped guide frame 101, between which the slide unit 102 is movably or displaceably arranged, i.e. mounted, can also be seen in this illustration.

Figure 3C:
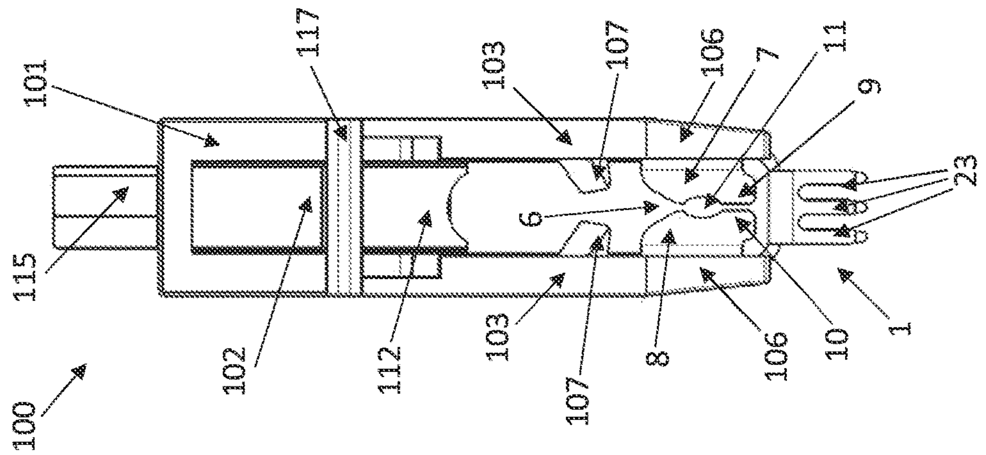
FIG. 3C, a front view of the exemplary embodiment of the tool shown and the terminal shown in FIG. 3A.
Figure 3B:
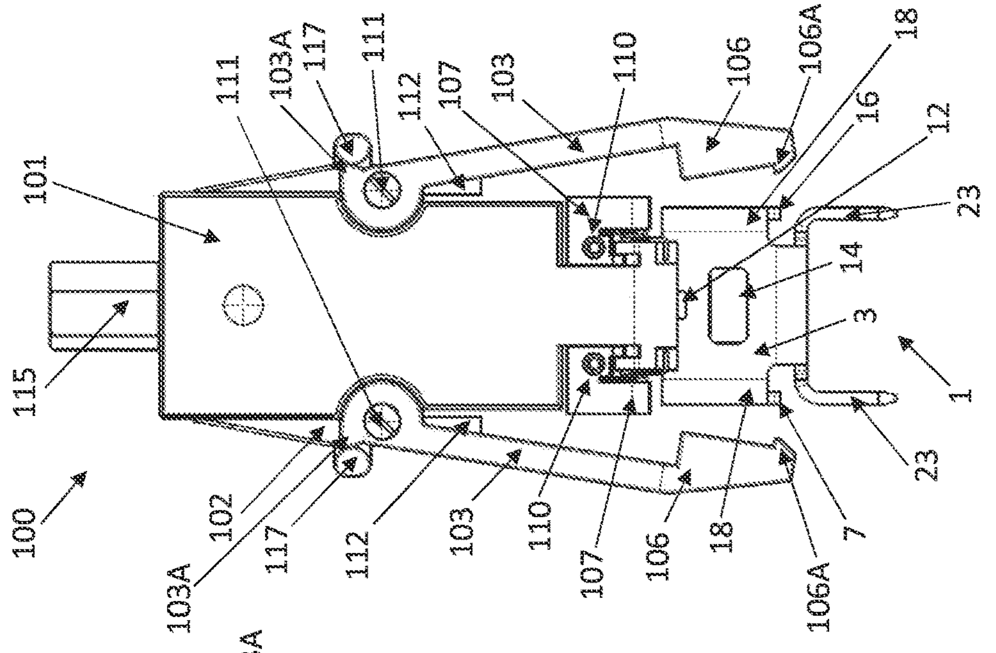
FIG. 3B, a side view of the exemplary embodiment of the tool shown and the terminal shown in FIG. 3A.
Figure 3A:
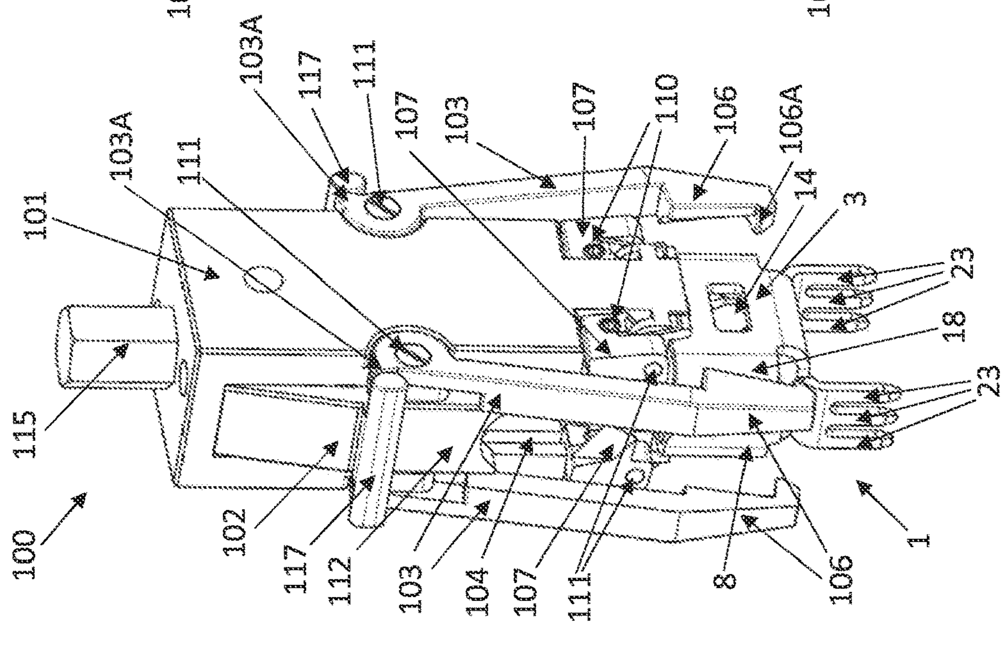
FIG. 3A, a perspective view of the exemplary embodiment of the tool shown in FIG. 2A to 2C and a further exemplary embodiment of a terminal.

FIG. 3A shows a perspective view of the exemplary embodiment of the tool 100 illustrated in FIG. 2A to 2C with a further exemplary embodiment of a terminal 1.

In this case, the terminal 1 is contacted at least sectionally by the tool 100 in the contact region of the tool 100. In other words, the arrangement of tool 100 and terminal 1 forms an at least sectionally form-fitting connection. The tool 100 is located on the end face of the terminal 1 on which the electrical conductor 2 (see in this regard FIG. 4A to 5C) is guided or placed on the terminal slot(s) 6 of the terminal 1 in order to then connect the electrical conductor 2 to the terminal 1.

The slide unit 102 and the locking elements 103 coupled thereto are in a starting position in the unfolded state.

FIG. 3B shows this state in a side view of the arrangement of the tool 100 with the terminal 1.

At least sectionally, the terminal 1 is configured and/or formed to fit the tool 100 with the locking elements 103.

The initial contact of the tool 100 with the terminal 1 occurs when the tool 100 is placed on the terminal 1, preferably via the groove-like cutout 12 and/or the groove-like cutout 13 through a correspondingly formed section 113 on the tool 100. This is explained in more detail below.

From FIG. 3C with the front view of the tool 100 with the terminal 1 shown therein, it can be seen that the terminal 1 has a slightly different design in comparison to terminal 1 shown in FIG. 1A to 1D. In particular, with the terminal 1 shown in FIG. 3A to 3C, the projections 9, 10 of the first and second terminal elements 7, 8 form a longer section of the terminal slot 6 than in the previously illustrated exemplary embodiment of the terminal 1.

Figures 4A, 4B, 4C:
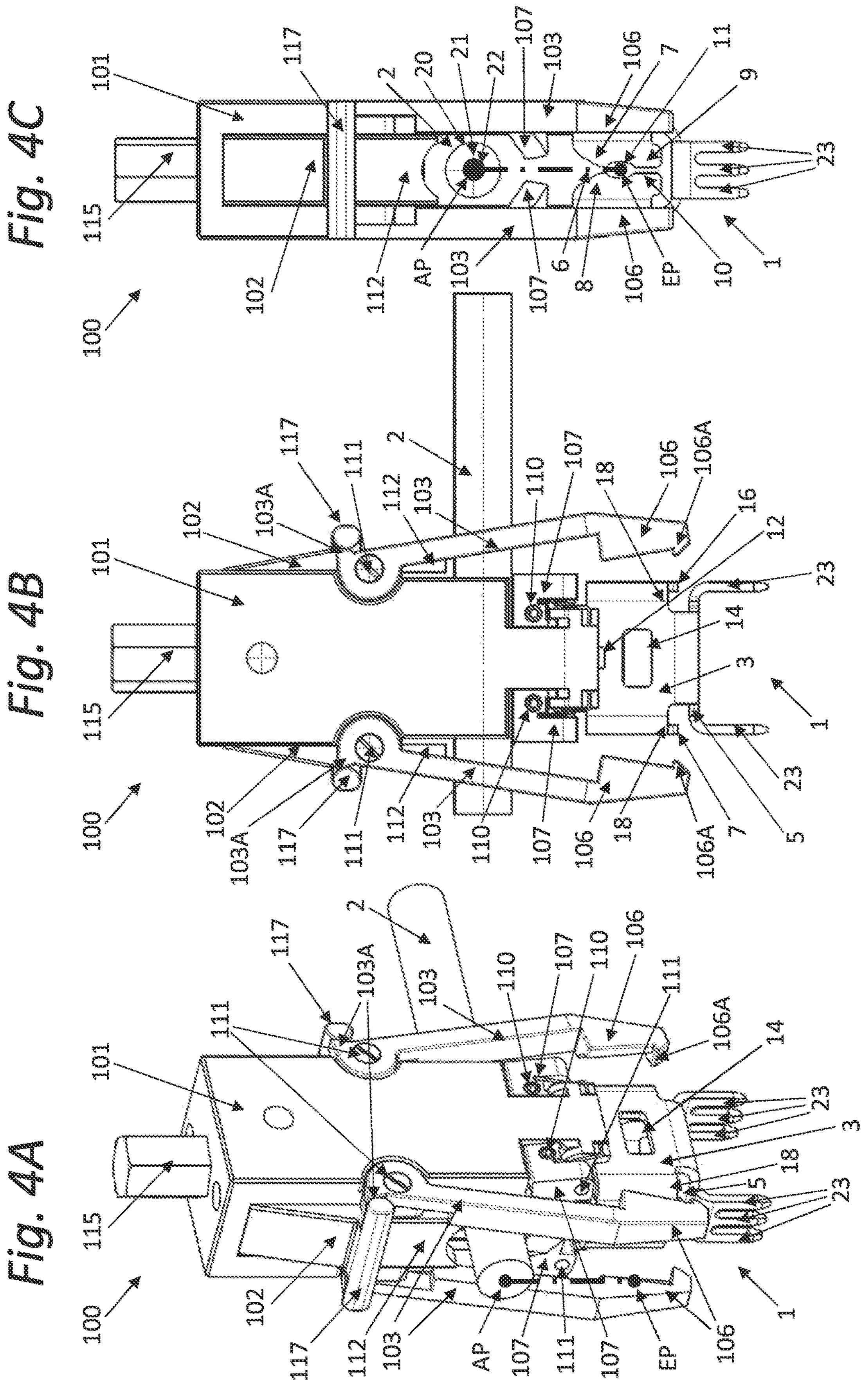
FIG. 4A, a perspective view of the exemplary embodiment of the tool and the terminal shown in FIG. 3A, as well as an electrical conductor inserted into the tool.
FIG. 4B, a side view of the exemplary embodiment of the tool shown and the terminal in FIG. 4A with the electrical conductor inserted into the tool.
FIG. 4C, a front view of the exemplary embodiment of the tool and the terminal shown in FIG. 4A with the electrical conductor inserted into the tool.

FIG. 4A shows a perspective view of the exemplary embodiment of the tool 100 and the terminal 1 shown in FIG. 3A, and an electrical conductor 2 inserted into the tool 100.

With regard to the front view shown in FIG. 4C, the electrical conductor 2 is designed as a sheathed conductor and comprises a sheath 20 (sheath insulation), a filling insulation 21 and a stranded wire 22 accommodated therein. The stranded wire 22 comprises a plurality of individual wires and is preferably made of an electrically conductive material, for example copper or a copper alloy, and serves to connect the electrical conductor 2 to the terminal 1 to establish an electrically conductive connection. The sheath 20 and/or the filling insulation 21 is preferably formed from an insulating material.

The electrical conductor 2 passes through the tool 100 and is located in a starting position AP above cutting elements 107, which are mounted on the tool 100 so as to be pivotable and preferably releasable or replaceable. In other words, the electrical conductor 2 is located before a yet to be performed cutting process of the electrical conductor 2 to expose the stranded wire 22. The mounting of the cutting elements 107 will be described with reference to the further FIG. 7A to 8C.

FIG. 4B shows a side view of the exemplary embodiment of the tool 100 and the terminal 1 shown in FIG. 4A with the electrical conductor 2 inserted into the tool 100.

FIG. 4C shows a front view of the exemplary embodiment of the tool 100 and the terminal 1 shown in FIG. 4A with the electrical conductor 2 inserted into the tool in the initial position AP, that is before being guided through or past the cutting elements 107 and being inserted, preferably pressed, into the terminal slot 6 and therefore into the connection section 11 of the terminal 1.

Figures 5A, 5B, 5C:
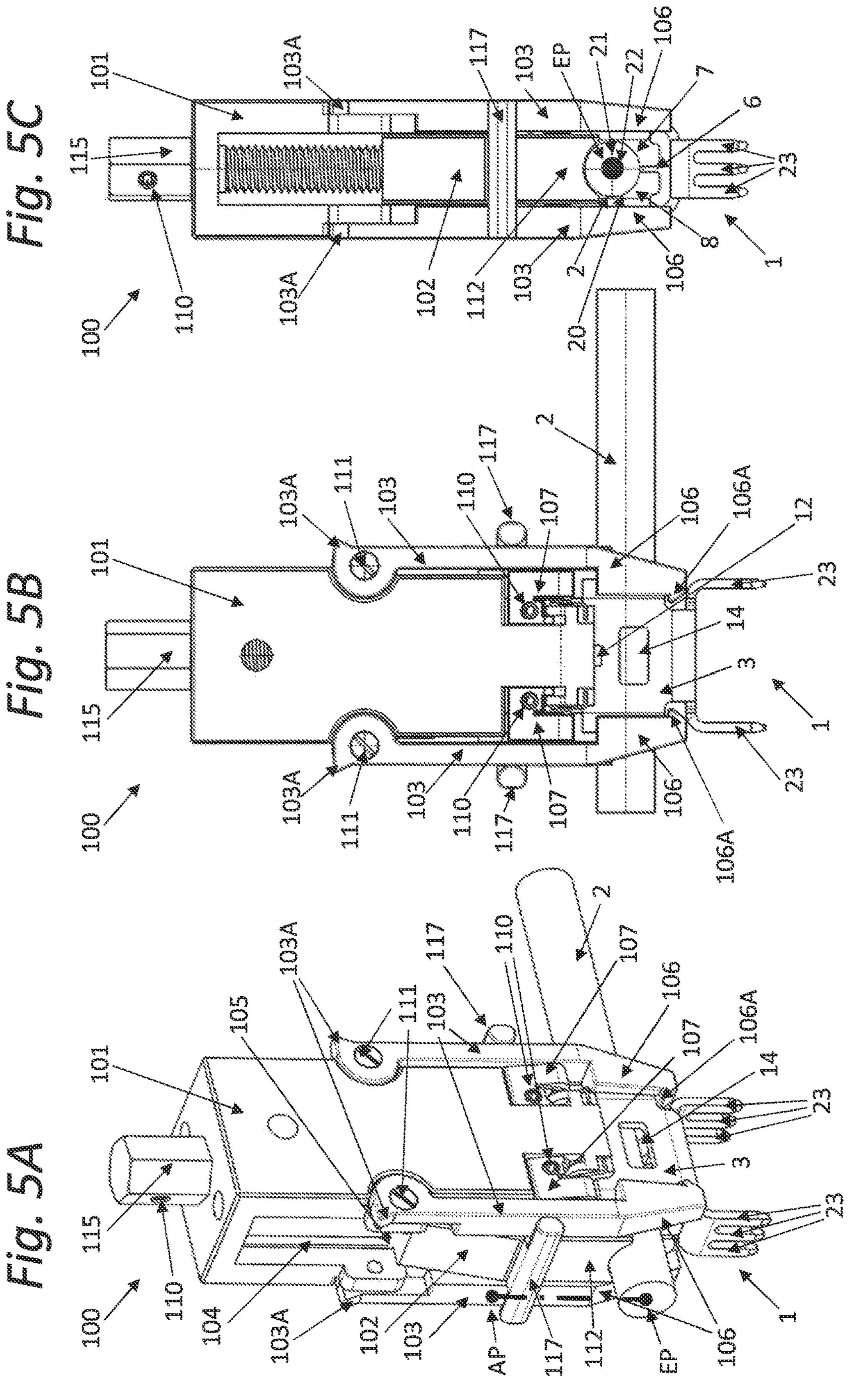
FIG. 5A, a perspective view of the exemplary embodiment of the tool and the terminal shown in FIG. 3A as well as an electrical conductor connected to the terminal.
FIG. 5B, a side view of the exemplary embodiment of the tool and the terminal shown in FIG. 5A with the electrical conductor connected to the terminal.
FIG. 5C, a front view of the exemplary embodiment of the tool and the terminal shown in FIG. 5A with the electrical conductor connected to the terminal.

FIG. 5A shows a perspective view of the exemplary embodiment of the tool 100 with the terminal 1 shown in FIG. 3A and an electrical conductor 2 connected to the terminal 1.

The electrical conductor 2 is located in an end position EP, that is to say in a connection position on the terminal 1, and therefore in the particular connecting section 11 within the terminal slots 6 of the terminal 1. In comparison to the state of the tool 100 illustrated in FIG. 4A to 4C, preferably the state of the slide unit 102, the slide unit 102 has been moved along the slot tracks 104 of the guide frame 101 towards the terminal 1. By moving the slide unit 102 and therefore guiding the electrical conductor 2 from an initial position AP to an end position EP, the locking elements 103 coupled to the slide unit 102 were simultaneously actuated by the two operating elements 117 of the slide unit 102.

The locking elements 103 were moved along the guide frame 101 with movement of the slide unit 102 around the respective bearing pins 111 to the tool 100 and therefore to the terminal 1, so that the wall sections of the retaining elements 18 of the terminal 1 at least sectionally contact and receive the hook sections 106 of the locking elements 103.

Preferably, the bearings of the locking elements 103, the slide unit 102 with its actuating elements 117, and the coupling of the slide unit 102 to the locking elements 103 are adapted to each other and/or are correspondingly configured and designed in such a way that retention of the terminal 1 by the hook sections 106 of the locking elements 103 has already taken place or been established or exists at a point in time before the electrical conductor 2 is guided by means of the slide unit 102 to the cutting elements 107 for at least sectional cutting. In other words, the locking elements 103 pivot at a very early point in time, that is to say after a short distance of the slide unit 102 in the direction of the terminal 1 in order to hold them on the correspondingly provided retaining elements 18 by means of the hook sections 106 of the locking elements 103 (see for example the illustration in FIG. 6A with the corresponding position of the slide unit 102 on the guide frame 101 and the actuating element 117 on the three visible locking elements 103).

Preferably, a more or less closed flow of force is formed between the terminal 1, the electrical conductor 2 and the tool 100. The introduction of mechanical loads, for example compressive forces, into a circuit board or printed circuit board on which the terminal 1 can for example be fastened, can therefore be avoided or at least significantly reduced.

FIG. 5B shows a side view of the exemplary embodiment of the tool 100 with the terminal 1 shown in FIG. 5A and the electrical conductor 2 connected to the terminal 1.

The hook sections 106 of the locking elements 103, which are applied to or contact the terminal 1, that is to say to the wall sections of the retaining elements 18, are clearly visible.

The electrical conductor 2 is preferably guided by the conductor guide sections 112 of the slide unit 102, preferably pushed or pressed into the terminal slots 6 of the terminal 1.

FIG. 5C shows a front view of the exemplary embodiment of the tool 100 and the terminal 1 illustrated in FIG. 5A with the electrical conductor 2 connected to the terminal 1.

In comparison to the illustrations in FIGS. 3C and 4C, the electrical conductor 2 is now integrated in the receiving sections 11 to form the connection to the terminal 1 (end position EP) and is held by the respective terminal elements 7, 8 and 16, 17.

FIG. 5C furthermore shows the formation of the plunger unit 115 for actuating the slide unit 102, which comprises a hexagonal screw head and a threaded spindle. In so doing, the threaded spindle converts rotational movements of the plunger unit 115 into a linear, i.e. translational movement of the slide unit 102. The plunger unit 115 can be driven by an electric motor, for example. Alternatively, the slide unit 102 and therefore the tool 100 can also be actuated by hand (with a corresponding key), for example.

Figure 6B:
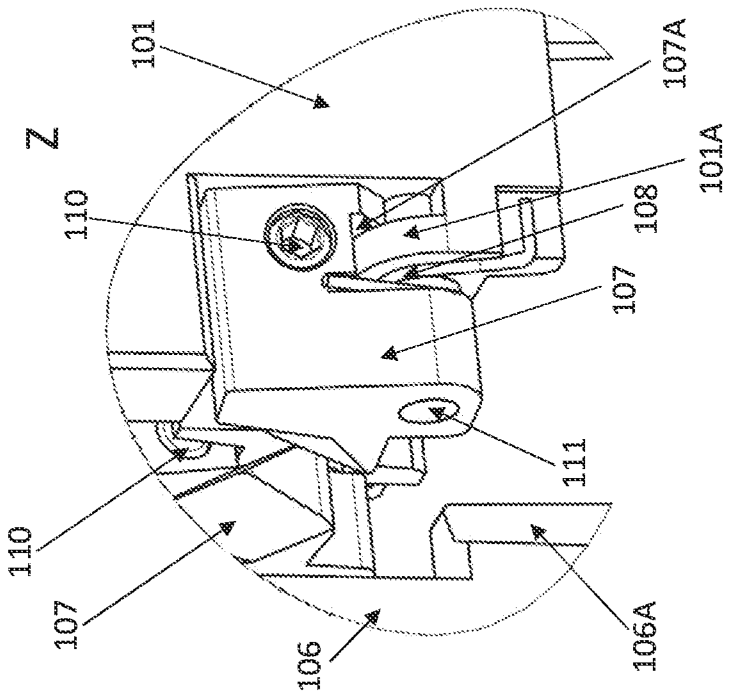
FIG. 6B, an enlarged region of the exemplary embodiment of the tool shown in FIG. 6A.
Figure 6A:
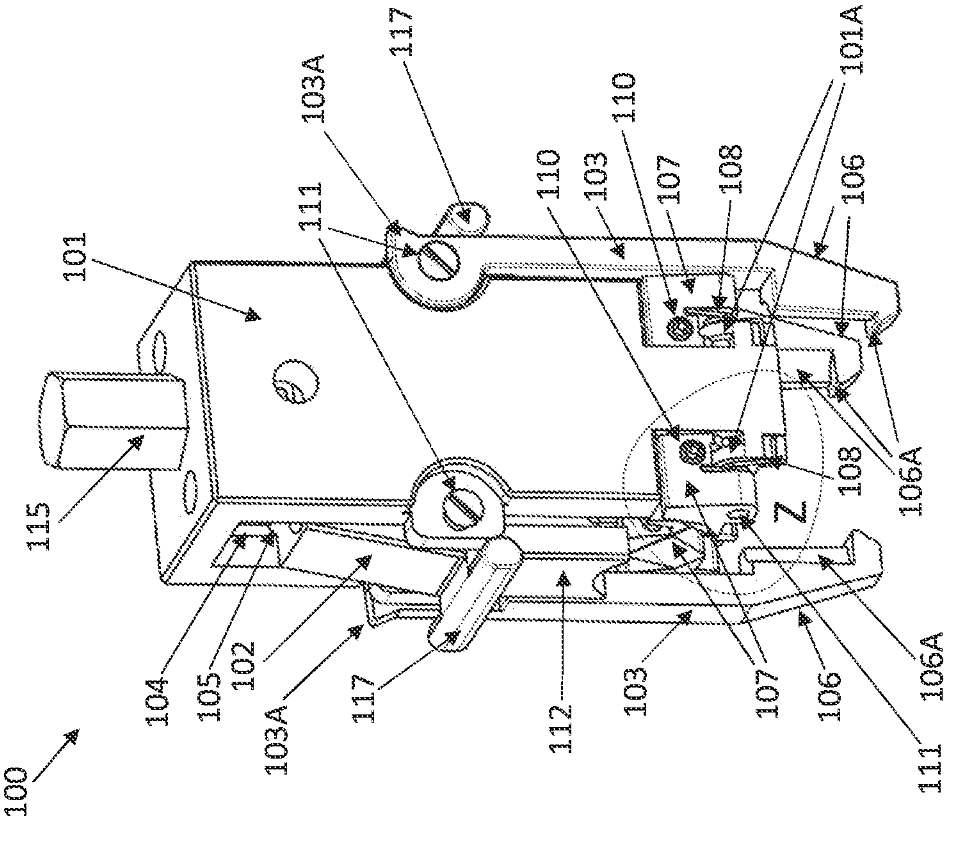
FIG. 6A, a perspective view of the exemplary embodiment of the tool shown in FIG. 2A.

FIG. 6A shows a perspective view of the exemplary embodiment of the tool 100 shown in FIG. 2A.

The cutting elements 107 are clearly visible, which cutting elements are releasably and pivotably mounted on guide frames 101 for at least sectional cutting, i.e. severing the insulation of the electrical conductor 2, before it is guided into the terminal slots 6 of the terminal 1 for connection to the terminal 1.

FIG. 6B shows an enlarged region of the exemplary embodiment of the tool 100 shown in FIG. 6A. The region of the bearing of a cutting element 107 on the guide frame 101 is preferably shown. The cutting element 107 is plugged on or attachable to a bearing pin 111 and is therefore pivotably mounted about the bearing pin 111. The bearing pin 111 in turn is held by a projection 101A of the guide frame 101, preferably by forming a plug connection, by means of which the bearing pin 111 is inserted through a bore in the projection 101A. Along the bearing on the bearing pin 111, the cutting element 107 comprises a cutout 107A which is configured and/or designed to at least sectionally receive the projection 101A of the guide frame 101, so that the cutting element 107 is secured in the direction of the bearing pin 111 and therefore in the axial direction.

A coil spring 108 is also located on the bearing pin 111 between the projection 101A and the cutting element 107. The coil spring 108 is supported on the one hand on the guide frame 101 and on the other hand on the cutting element 107. The coil spring 108 applies pretension to the cutting element 107, so that, in the case of an outward pivoting process of the cutting element 107 about the bearing pin 111, the cutting element 107 is returned to the original position on the guide frame 101, that is to say to a corresponding stop of the guide frame 101.

By means of a screw connection 110 preferably using a grub screw in the cutting element 107, the position can be variably adjusted of the cutting element 107 relative to the guide frame 101 and therefore also to the slide unit 102 and to the electrical conductor 2. Therefore, the cutting element 107 can be individually adjusted for electrical conductors 2 of different size, i.e. different diameters of the sheath insulation 20, and can be adjusted relatively easily.

Due to the releasable pivot mounting of the cutting element 107, the cutting element 107 can also be replaced with a different cutting element 107 with a different configuration (for example with respect to the cutting angle, cutting edge, size, and cutting depth). Thus, for example, electrical conductors 2 of different sizes can also be accommodated as a result.

Figure 7C:
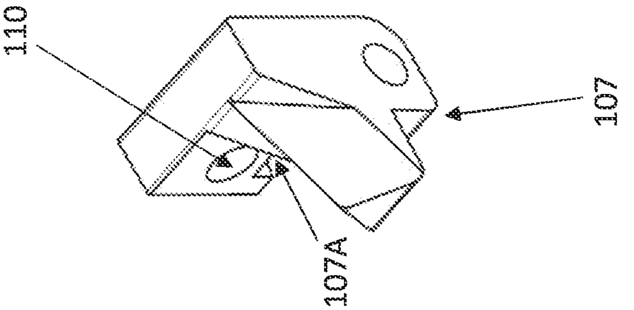
FIG. 7C, a perspective view of the cutting element shown in FIG. 7B.
Figure 7B:
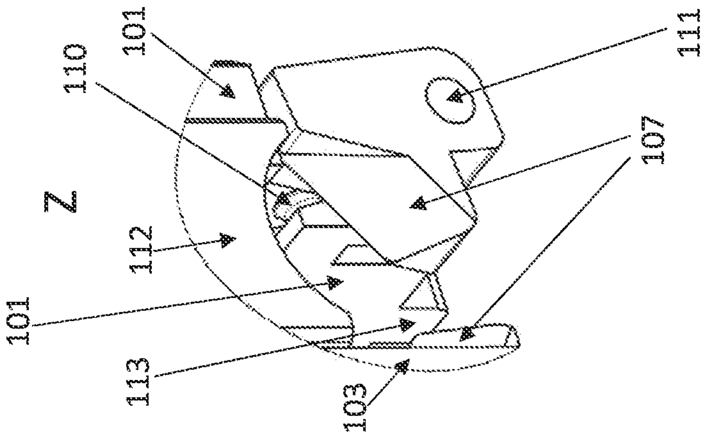
FIG. 7B, an enlarged region of the exemplary embodiment of the tool shown in FIG. 7A.
Figure 7A:
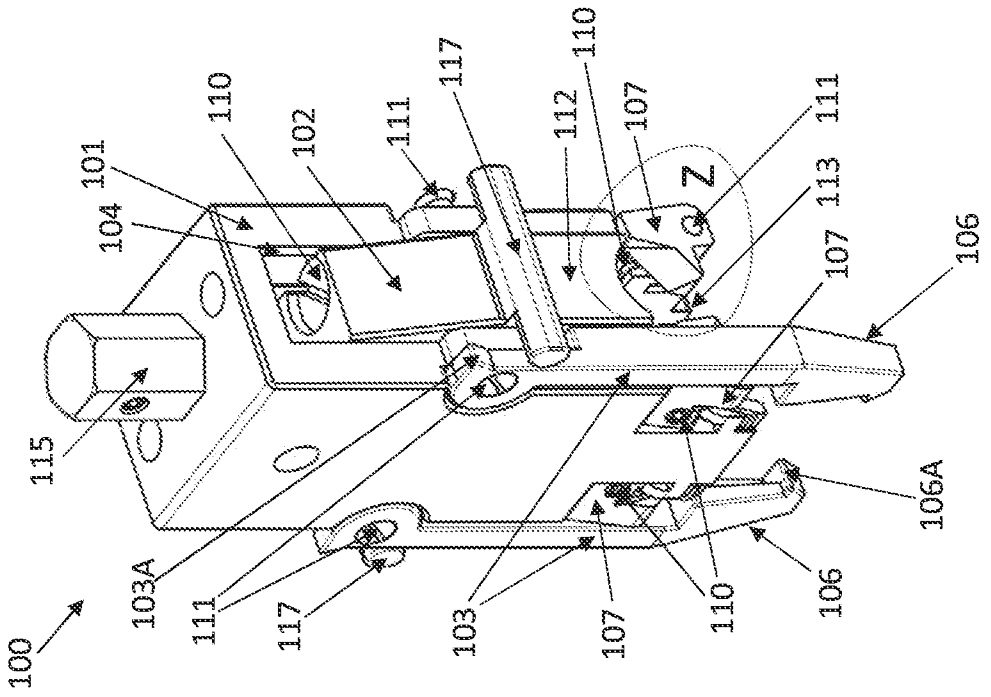
FIG. 7A, a further perspective view of the exemplary embodiment of the tool shown in FIG. 6A.

FIG. 7A shows a further perspective view of the exemplary embodiment of the tool 100 shown in FIG. 6A, wherein a locking element 103 has been omitted for a better view of the cutting element 107.

In this illustration, a projection 113 of the guide frame 101 in the form of a spring-shaped or pin-like section on the guide frame 101 is also visible.

The projection 113 is configured and/or designed in such a way that it can be at least sectionally inserted or engaged in a form-fitting manner in the groove-like cutout 12 of the terminal 1 in order, for example, to optimally position the tool 100 relative to the terminal 1, or to guide it for placement on the terminal 1. This ensures, for example, a rapid and easy mounting process of the connection of the electrical conductor 2 to the terminal 1. The tool 100 is always located at a defined position or in contact with the terminal 1.

FIG. 7B shows an enlarged region of the exemplary embodiment of the tool 100 shown in FIG. 7A.

The cutting element 107 is plugged on or attachable to the bearing pin 111, as already described above, and pivotably mounted about the latter. A section of the cutting element 107 comprises the already described screw connection 110 with the grub screw, which contacts a stop on the guide frame 101 in order to be able to adjust the cutting element 107 with respect to its positioning or arrangement relative to the guide frame 101 and therefore to an electrical conductor 2.

The spring-shaped or pin-like projection 113 of the guide frame 101 can also be clearly seen in this figure.

FIG. 7C shows a perspective view of the cutting element from FIG. 7B. The cutting element 107 is preferably wedge-shaped and therefore comprises, in addition to a cutting edge, a section which widens from the cutting edge, in order to therefore at least sectionally push or press the cut sheath 20 of the electrical conductor 2 apart to expose the wire, the single wire or the stranded wire 22 of the electrical conductor 2, and to prepare it for the connection process of the electrical conductor 2 to the terminal 1.

Figure 8C:
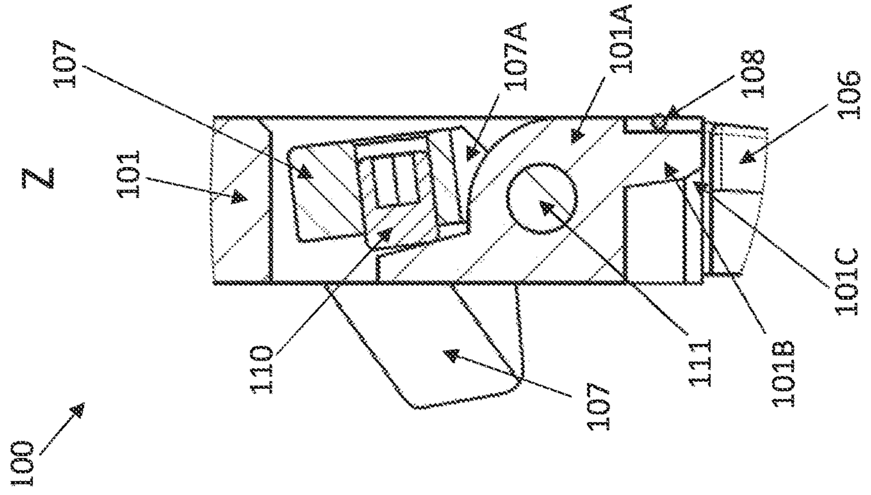
FIG. 8C, an enlarged region of the exemplary embodiment of the tool shown in a sectional view in FIG. 8B.
Figure 8B:
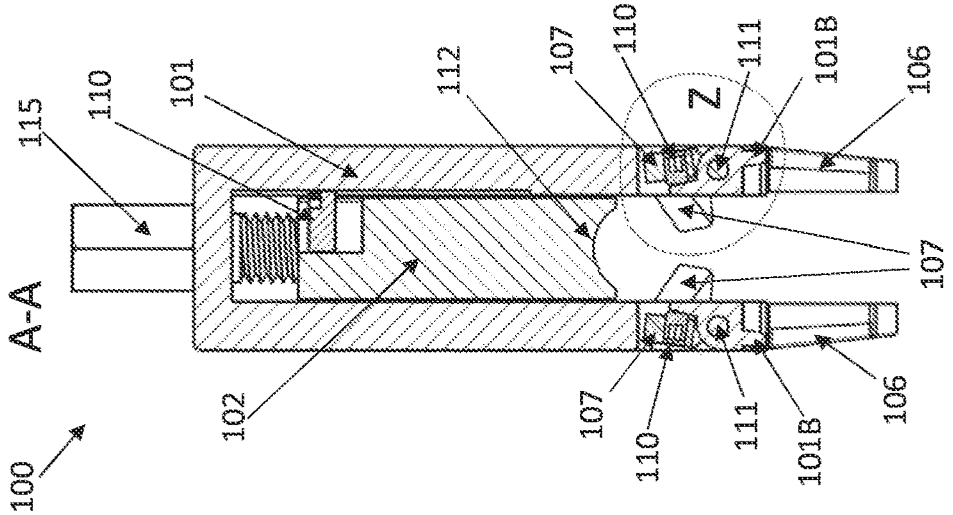
FIG. 8B, a sectional view (section A-A in FIG. 8A) of the exemplary embodiment of the tool shown in FIG. 8A.
Figure 8A:
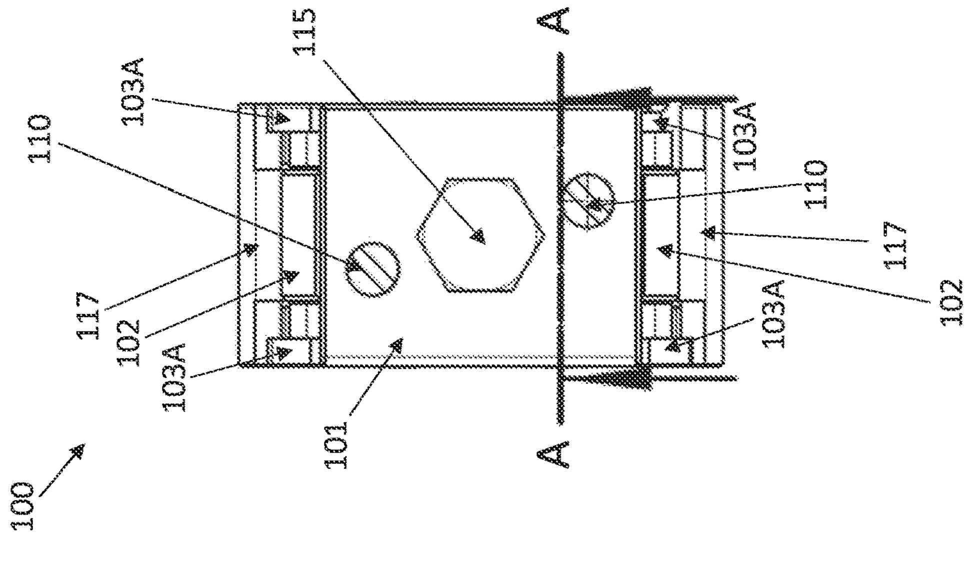
FIG. 8A, a plan view of the exemplary embodiment of the tool shown in FIG. 2A.

FIG. 8A shows a plan view of the exemplary embodiment of the tool 100 shown in FIG. 2A. In this case, the locking elements 103 are located on the leg regions of the guide frame 101. Screw connections 110 through bores in the bar region of the guide frame 101 can be seen, the purpose of which is described in more detail below with reference to further figures. The plunger element 115 has a hexagonal head for actuating the slide unit 102.

FIG. 8B shows a sectional view (section A-A in FIG. 8A) of the exemplary embodiment of the tool 100 shown in FIG. 8A.

The first opposite pair of cutting elements 107 is shown in the sectional view. As already described, a cutting element 107 is mounted releasably and pivotably by a bearing pin 111. The cutting elements 107 are plugged onto the bearing pin 111. The bearing pins 111 are in turn fastened or mounted at least sectionally on projections 101A of the guide frame 101. By means of the screw connections 110 which comprise grub screws which contact a section of the guide frame 101 serving as a stop, the cutting elements 107 are designed to be adjustable with respect to their position and/or their angle on guide frames 101.

FIG. 8C shows an enlarged region of the exemplary embodiment of the tool 100 shown in a sectional view in FIG. 8B.

The grub screws of the screw connection 110, which contact a stop of the guide frame 101, are clearly visible. Furthermore, it can be seen from FIG. 8C that a region of the cutout 107A of the cutting element 107 lies behind the projection 101A of the guide frame 101 in the direction of the bearing pin 111. Securing in the sense of fixing the cutting element 107 in the direction of the bearing pin 111 and therefore in the axial direction is therefore ensured. In addition, the cross-section of a section of the coil spring 108 can be seen, which is preferably supported on the guide frame 101, that is to say the shoulder 101B of the guide frame 101, in order to be able to return the cutting element 107 to a starting position or stop position by applying force to the cutting element 107.

On the side opposite the side on which the coil spring 108 contacts the guide frame 101, the shoulder 101B serves as a boundary for the terminal 1 and is described in more detail below. The shoulder 101B comprises, at least sectionally, a chamfer 101C which is to facilitate the placement process or attachment process of the tool 100 to the terminal 1 for contacting.

Figures 9A, 9B, 9C:
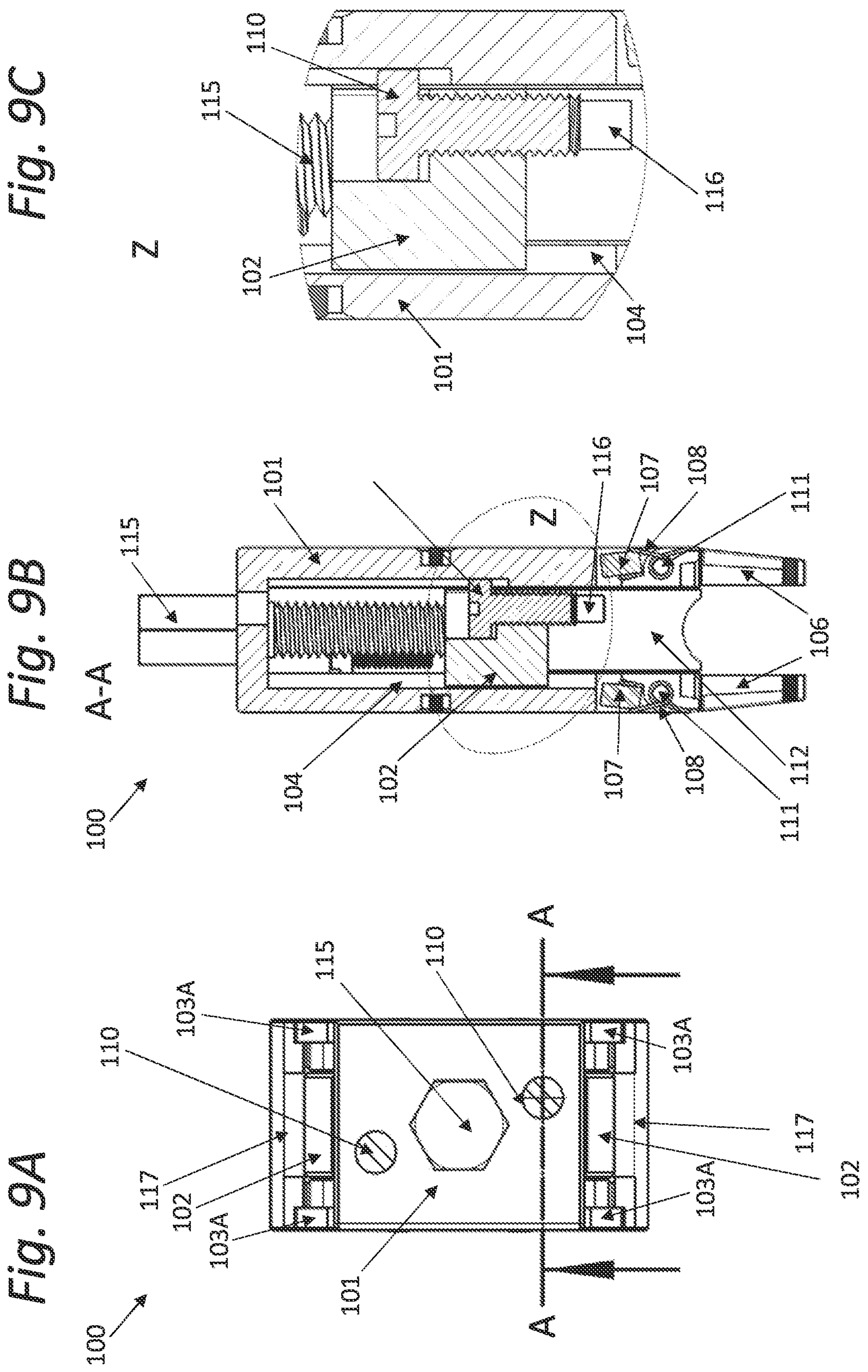
FIG. 9A, a plan view of the exemplary embodiment of the tool shown in FIG. 2A.
FIG. 9B, a sectional view (section A-A in FIG. 9A) of the exemplary embodiment of the tool shown in FIG. 9A.
FIG. 9C, an enlarged region of the exemplary embodiment of the tool shown in a sectional view in FIG. 9B.

FIG. 9A shows, analogous to FIG. 8A, a plan view of the exemplary embodiment of the tool 100 shown in FIG. 2A.

FIG. 9B shows a sectional view (section A-A in FIG. 9A) of the exemplary embodiment of the tool 100 shown in FIG. 9A.

The plunger element 115 with the threaded spindle for actuating, i.e. moving the slide unit 102, is arranged between the slide unit 102 and the bar region of the guide frame 101. The threaded spindle is preferably located within the leg regions of the guide frame 101.

The slide unit 102 comprises two stop elements 116. The stop element 116 is arranged within the guide frame 101 and on the side of the slide unit 102 which is assigned to the terminal 1. The stop element 116 is adjustable in its position relative to the slide unit 102 by means of a screw connection 110. The screw connection 110 can comprise, for example, a flat head screw on which the stop element 116 is arranged.

The stop element 116 contacts, at least sectionally, the terminal 1 (not shown in FIG. 9B), that is to say preferably an end face at the end face of the terminal 1 on which the electrical conductor 2 is guided or placed on the terminal slot 6 for connection to the terminal 1.

As a result of the adjustability of the stop element 116 with respect to the slide unit 102, a defined position of the slide unit 102 and therefore a defined end position of the electrical conductor 2 can therefore be realized at the desired location or in the desired region in the connecting section 11 of the terminal 1.

FIG. 9B furthermore clearly shows the reception of coil springs 108 on the bearing pins 111 for applying pretension to the cutting elements 107.

FIG. 9C shows an enlarged region of the exemplary embodiment of the tool 100 shown in a sectional view in FIG. 9B.

The stop element 116 is shown herein is graphically highlighted, designed substantially cylindrical, and is arranged at the end of a threaded bolt of a flat head screw 110. The stop element 116 can for example be formed from a plastic material.

The screw connection 110 with the flat head screw is accommodated in the slide unit 102 and is adjustable or settable relative thereto.

In addition, a section is shown of a slot track 104 on which the slide unit 102 is movably mounted and can therefore slide along. The slot track 104 is preferably formed integrally with the guide frame 101.

Figure 10B:
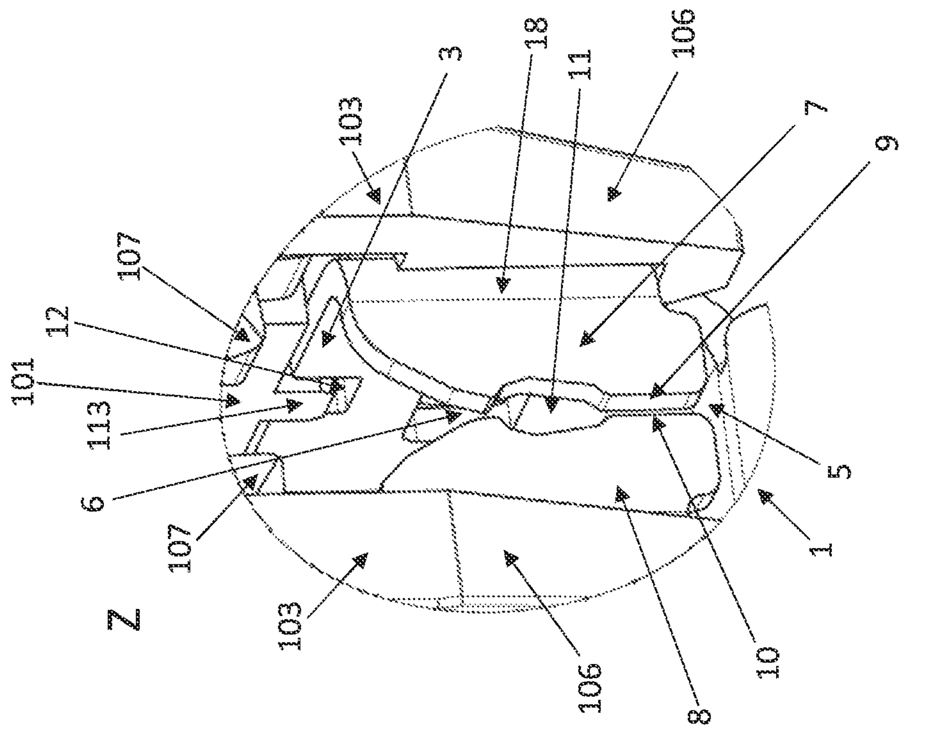
FIG. 10B, an enlarged region of the exemplary embodiment of the tool with terminal shown in FIG. 10A.
Figure 10A:
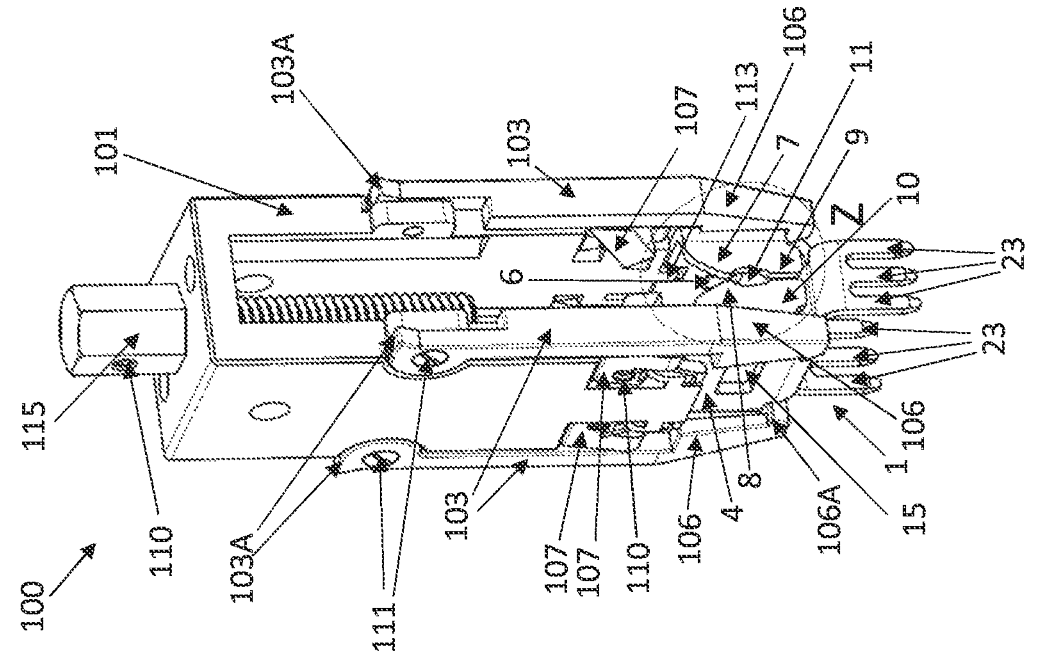
FIG. 10A, a perspective view of the exemplary embodiment of the tool shown in FIG. 3A (without slide unit) with terminal.

FIG. 10A shows a perspective view of the exemplary embodiment of the tool 100, which is shown in FIG. 3A, without a slide unit 102, but with a contacted, i.e. held terminal 1.

FIG. 10B shows an enlarged region of the exemplary embodiment of the tool 100 shown in FIG. 10A with the accommodated terminal 1.

The at least sectionally form-fitting connection between the spring-shaped or pin-shaped projection 113 of the guide frame 101 and the groove-shaped cutout 12 of the terminal 1, in which the projection 113 engages in the cutout 12, can be clearly seen.

Also discernible is the detachable fastening of the terminal 1 to the tool 100 by the hook section 106 of a locking element 103, which at least sectionally contacts and/or grasps around a retaining element 18 of the terminal 1.

The terminal 1 is therefore held by the tool 100, so that, preferably during the connection of the electrical conductor 2 to the terminal 1, that is to say during the connection process to form an electrically conductive connection between the electrical conductor 2 and the terminal 1, no or at least negligible loads are transmitted via the terminal 1 to, for example, a printed circuit board on which the terminal 1 is fastened.

Figure 11A:
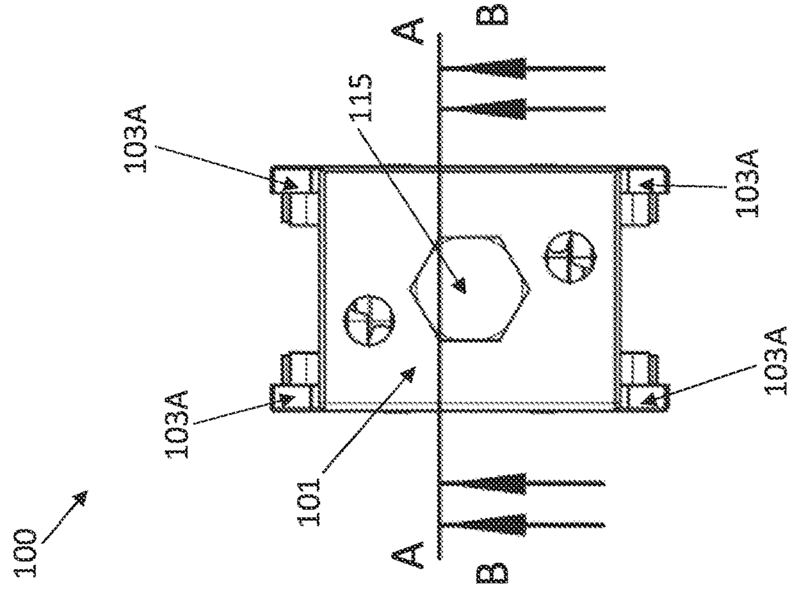
FIG. 11A, a plan view of the embodiment of the tool (without slide unit) with terminal shown in FIG. 3A.

FIG. 11A shows a further plan view of the exemplary embodiment of the tool 100, shown in FIG. 3A, without a slide unit 102 but with a terminal 1.

Figure 11B:
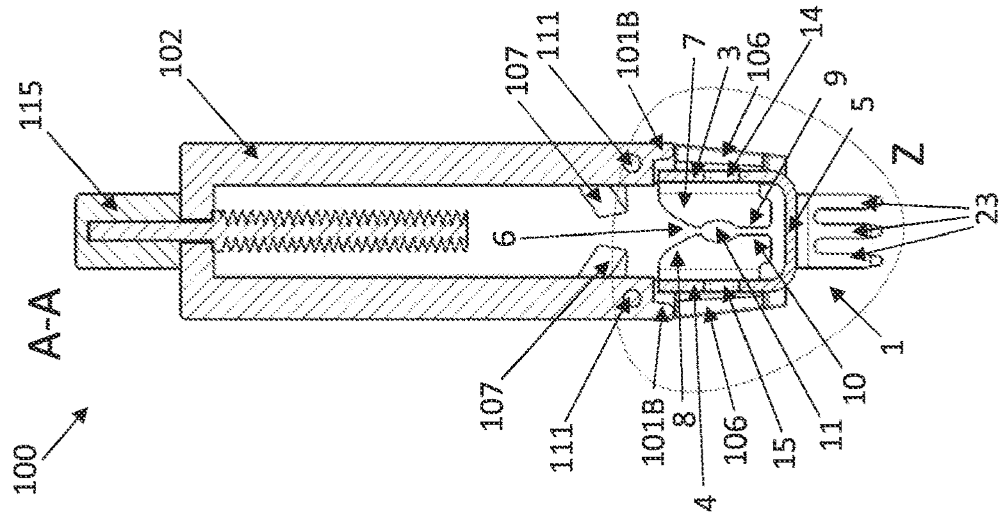
FIG. 11B, a sectional view (section A-A in FIG. 11A) of the exemplary embodiment of the tool with terminal shown in FIG. 11A.

FIG. 11B shows a sectional view (section A-A in FIG. 11A) of the exemplary embodiment of the tool 100 with the terminal 1 shown in FIG. 11A.

Figure 11C:
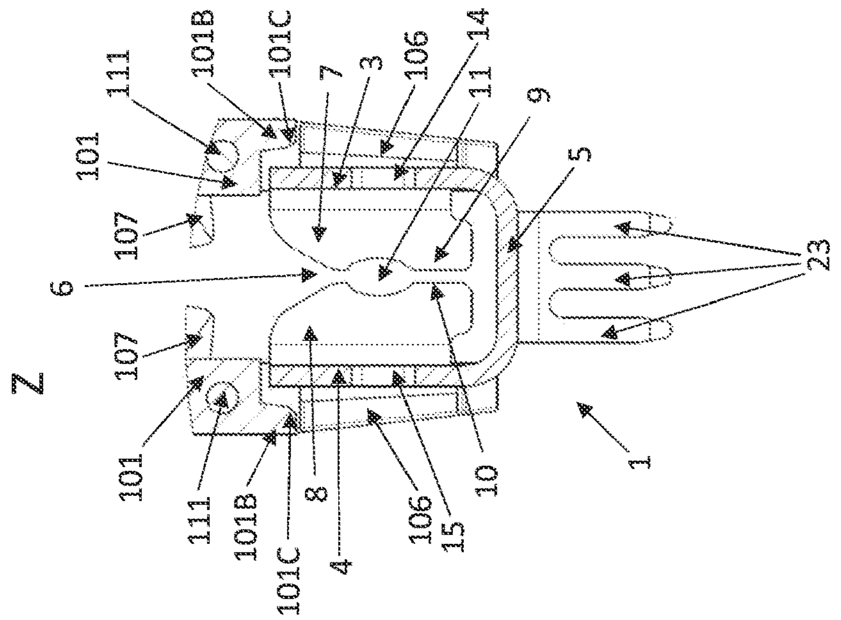
FIG. 11C, an enlarged region of the exemplary embodiment of the tool with terminal shown in a sectional view in FIG. 11B.

FIG. 11C shows an enlarged region of the exemplary embodiment of the tool 100 with the terminal 1 shown in a sectional view in FIG. 11B. The terminal 1 is shown in a state in which the terminal 1 is held by the tool 100 in the contact region of the tool 100. The side wall sections 3, 4 are accommodated in sections in corresponding shoulders 101B, preferably folds 101B, of the guide frame 101. The shoulders 101B are arranged opposite the guide frame 101 and are configured and/or designed according to the terminal 1.

For receiving the terminal 1, each shoulder 101B has a chamfer 101C on an inner region, that is to say a region directed towards the receiving terminal 1. An improved or simpler attachment of the tool 100 to the terminal 1 can therefore be achieved. Alternatively, a rounding can be provided instead of the chamfer 101C.

Figure 11E:
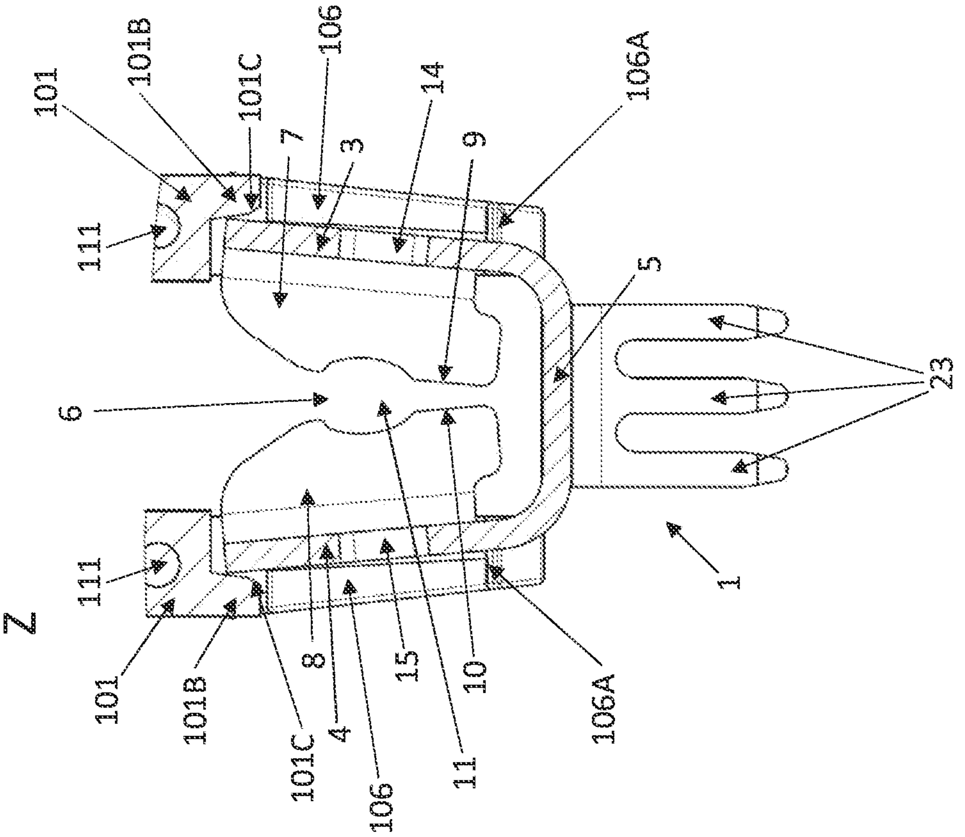
FIG. 11E, an enlarged region of the exemplary embodiment of the tool with (expanded) terminal shown in a sectional view in FIG. 11D.
Figure 11D:
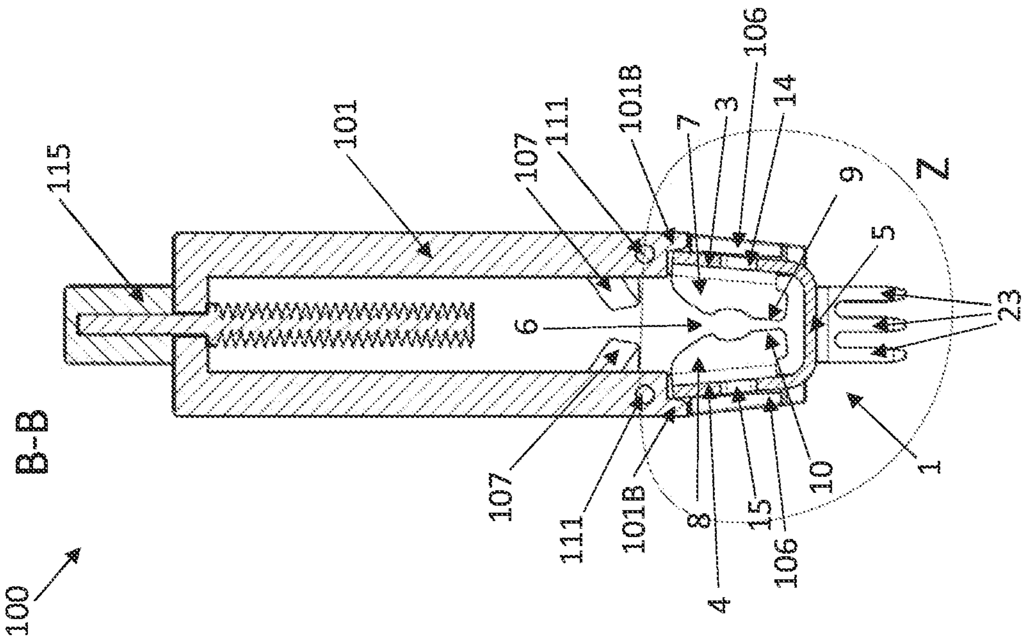
FIG. 11D, a sectional view (section B-B in FIG. 11A) of the exemplary embodiment of the tool with (expanded) terminal shown in FIG. 11A.

FIG. 11D shows a sectional view (section B-B in FIG. 11A) of the exemplary embodiment of the tool 100 shown in FIG. 11A with a widened terminal 1, i.e. an enlarged terminal slot 6.

FIG. 11D shows the terminal 1 in a state in which the electrical conductor 2 (not shown in FIG. 11B for reasons of clarity) can be guided or guided into the terminal slot 6.

FIG. 11E shows an enlarged region of the exemplary embodiment of the tool 100, shown in sectional view in FIG. 11D, with a widened terminal 1. In this graphically highlighted illustration, it is shown that the terminal 1 is contacted at least sectionally with the shoulders 101B at its end face on which the electrical conductor 2 is guided or placed on the terminal slot 6, or is delimited by the shoulders 101B with respect to an expansion. In other words, the first side wall section 3 and the second side wall section 4 are limited in their resilient movement options by the shoulders 101B of the guide frame 101. This prevents, for example, the terminal 1 from plastically deforming during the connection process of the electrical conductor 2, since an excessive widening of the terminal 1 is prevented.

FIG. 12A shows a perspective view of the tool 100 with terminal 1 shown in FIG. 3A. FIG. 12B shows an enlarged region of the exemplary embodiment of the tool 100 with terminal 1 shown in FIG. 12A.

FIG. 12B shows the coupling of the locking element 103 which is pivotably and preferably releasably mounted on the guide frame 101 by a bearing pin 111. The pivotability of the locking element 103 about the bearing pin 111 is shown in FIG. 12B by a double arrow for the sake of clarity.

The locking element 103 has an oblique projection 103A adjacent to the lever-shaped section of the locking element 103 with its sliding contact surface for the actuating element 117. The projection 103A is arranged at a distance from the bearing pin 111 and therefore from the pivot axis of the locking element 103. Therefore, by actuating, i.e. contacting the projection 103A with the actuating element 117, force and therefore torque can be introduced into the locking element 103, which pivots the locking element 103 away from the tool 100 and therefore releases a held terminal 1.

It is possible for the bearing pin 111 to form, at least sectionally, a screw connection 110 with the guide frame 101 (not shown in FIGS. 12A and 12B), that is, to have at least sectionally an external thread, in order to be able to be fastened in a corresponding internal thread in the guide frame 101. Furthermore, it is possible for the bearing pin 111 to additionally have a cylindrical head section with a correspondingly larger diameter in order to bear or secure the locking element 103 on the bearing pin 111 in the axial direction, that is to say in the longitudinal direction of the bearing pin 111.

In the exemplary embodiment of the tool 100 shown in FIG. 12B, the bearing pin 111 can be detachably fastened to the guide frame 101 in order to form a screw connection by means of a flat blade screwdriver. In this case, the locking element 103 is already arranged on the bearing pin 111.

Figure 13C:
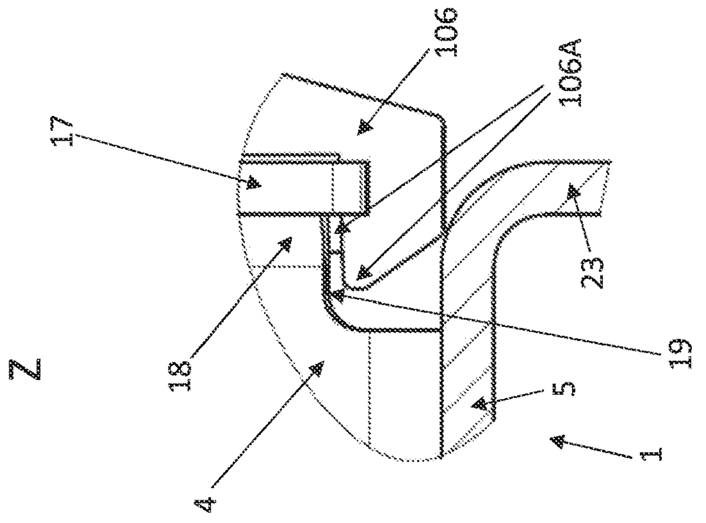
FIG. 13C, an enlarged region of the exemplary embodiment of the tool with a terminal shown in a sectional view in FIG. 13B.
Figure 13B:
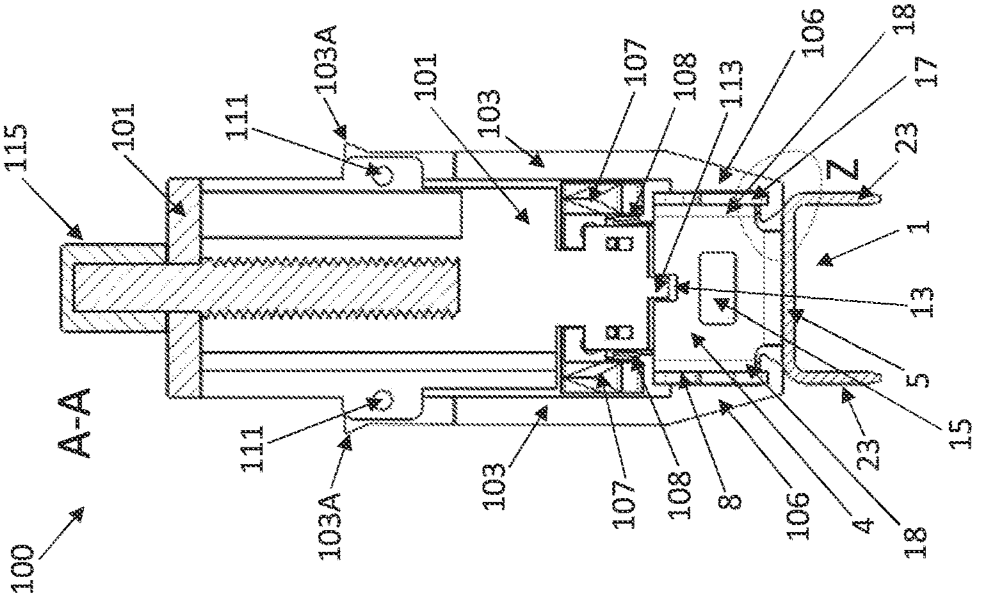
FIG. 13B, a sectional view (section A-A in FIG. 13A) of the exemplary embodiment of the tool with a terminal shown in FIG. 13A.
Figure 13A:
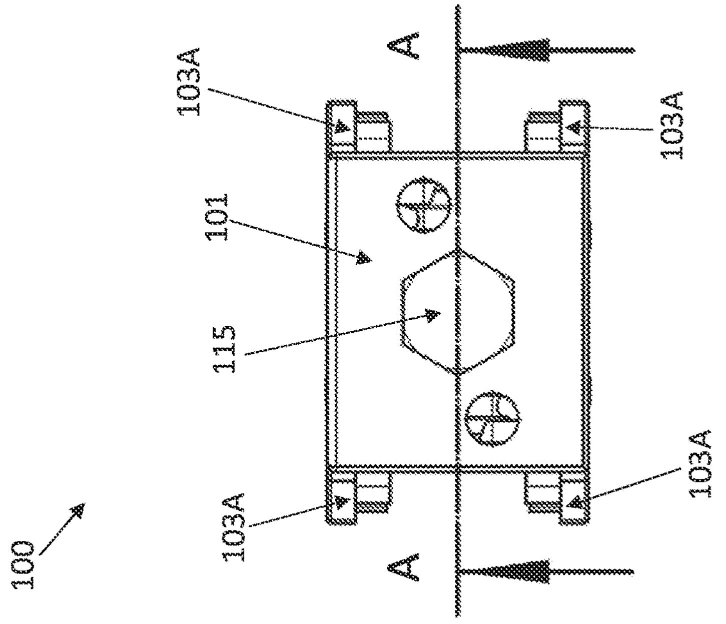
FIG. 13A, a plan view of the exemplary embodiment of the tool (without a slide unit) with a terminal shown in FIG. 3A.

FIG. 13A shows a plan view of the exemplary embodiment of the tool 100, shown in FIG. 3A, without the slide unit 102 but with the terminal 1. FIG. 13B shows a sectional view (section A-A in FIG. 13A) of the exemplary embodiment of tool 100 with the terminal 1 shown in FIG. 13A.

The cutout 13 of the terminal 1 visible in this view makes contact sectionally with the pin-shaped projection 113 of the guide frame 101 (this also applies to the cutout 12 of the terminal 1—see for example FIG. 10B). Furthermore, the terminal 1 is held on the tool 100 by means of the locking elements 103, which contact the retaining elements 18 of the terminal 1.

The terminal 1 is therefore detachably fastened or held on the tool 100, so that loads, preferably compressive forces, occurring during the connection of the electrical conductor 2 to the terminal 1 occur predominantly only within the system of the tool 100, electrical conductor 2, and terminal 1.

FIG. 13C shows an enlarged region of the exemplary embodiment of the tool 100 with terminal 1 shown in a sectional view in FIG. 13B. The hook section 106 comprises sectionally a rounding 106A and/or a chamfer 106A.

The chamfer 106A is formed here on the region of the hook section 106 facing the contact surface 19 of the retaining element 18, so that an improved contacting process of the locking element 103 with the terminal 1 can take place.

In addition, the hook section 106 sectionally comprises a rounding 106A, which extends along the region of the hook section 106, which can contact the wall section of the retaining element 18 (partially visible in FIG. 13C), which adjoins the second side wall section 4. The rounding 106A preferably also allows a widening of the terminal 1 in a certain region.

The terminal 1 can therefore be optimally held by the locking element 103 of the tool 100.

Figure 14B:
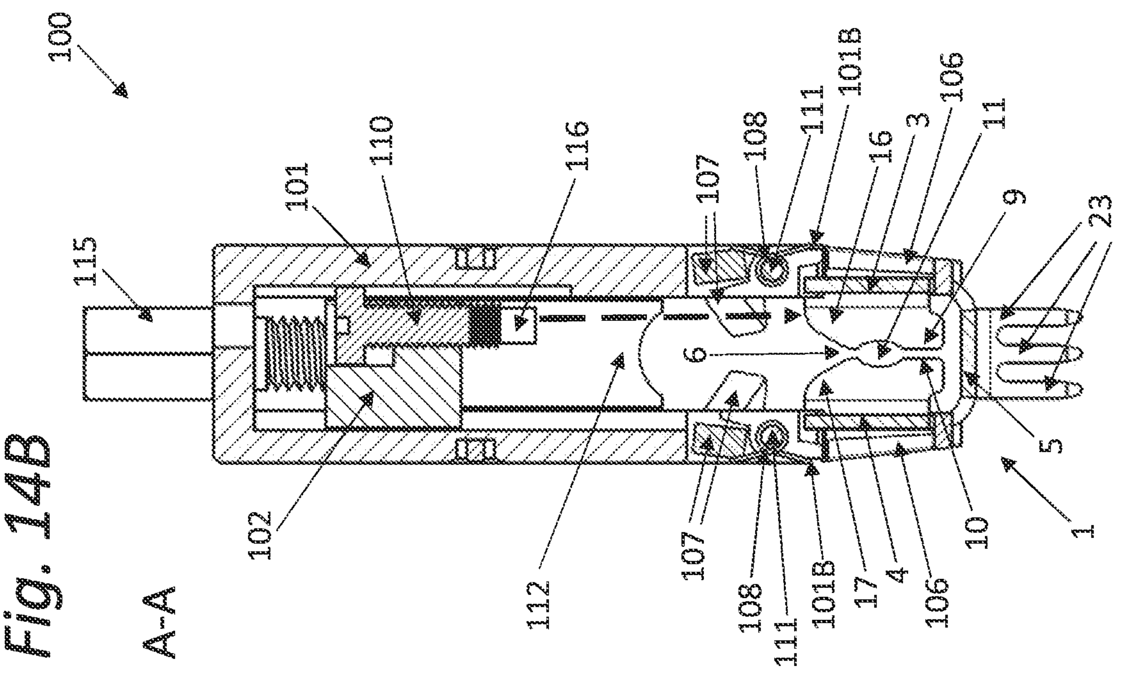
FIG. 14B, A sectional view (section A-A in FIG. 14A) of the exemplary embodiment of the tool with a terminal shown in FIG. 14A.
Figure 14A:
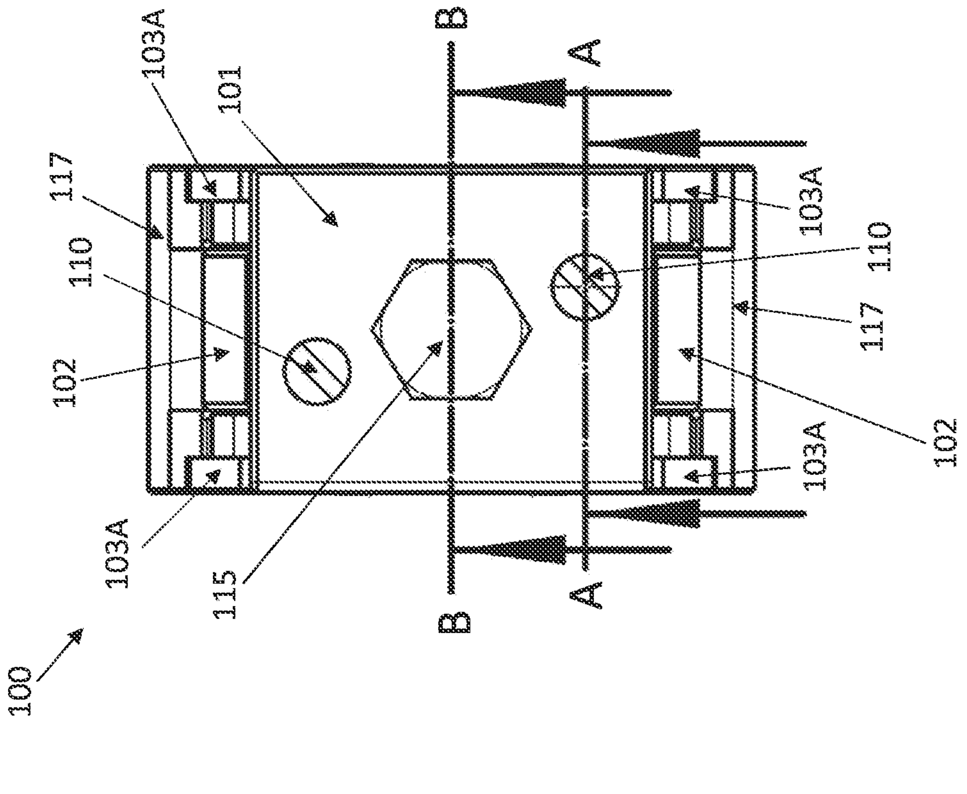
FIG. 14A, a plan view of the embodiment of the tool with a terminal shown in FIG. 3A.

FIG. 14A shows a plan view of the exemplary embodiment of the tool 100 shown in FIG. 3A with terminal 1. FIG. 14B shows a sectional view (section A-A in FIG. 14A) of the exemplary embodiment of tool 100 with terminal 1 shown in FIG. 14A.

The slide unit 102 is shown in an initial position such that the electrical conductor 2 can be inserted into the tool 100 between the slide unit 102, that is to say the conductor guide section 112, and the cutting elements 107.

In addition, an arrow shows the movement of the slide unit 102 and preferably the stop element 116 on the slide unit 102 in the direction of the terminal 1 at which the stop element 116 then contacts, at least sectionally, an end face of the terminal 1 and therefore adjustably limits the movability of the slide unit 102 along the guide frame 101. The adjustability can preferably be a function of the configuration and/or design of the terminal 1 and/or the electrical conductor 2 to be connected.

Figure 14D:
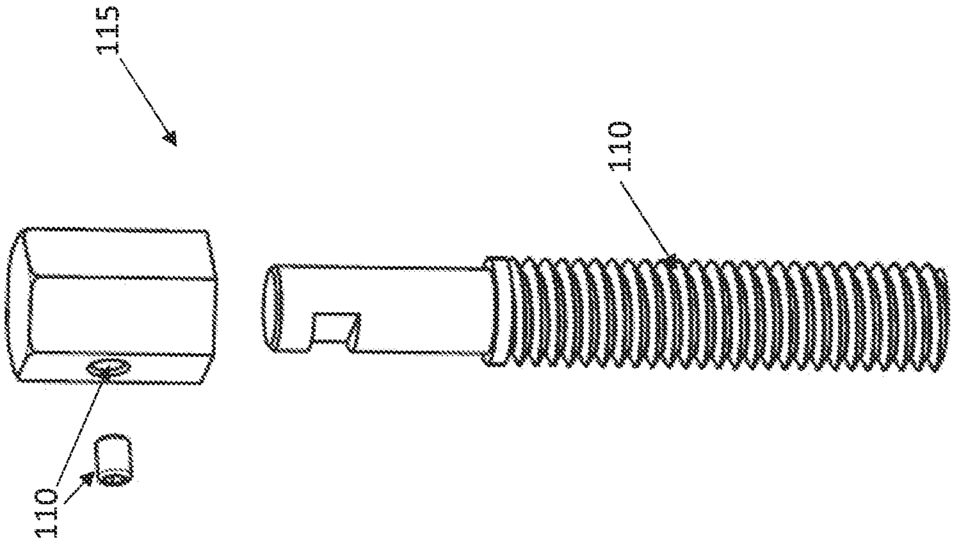
FIG. 14D, a perspective view of the plunger element of the exemplary embodiment of the tool shown in FIG. 3A.
Figure 14C:
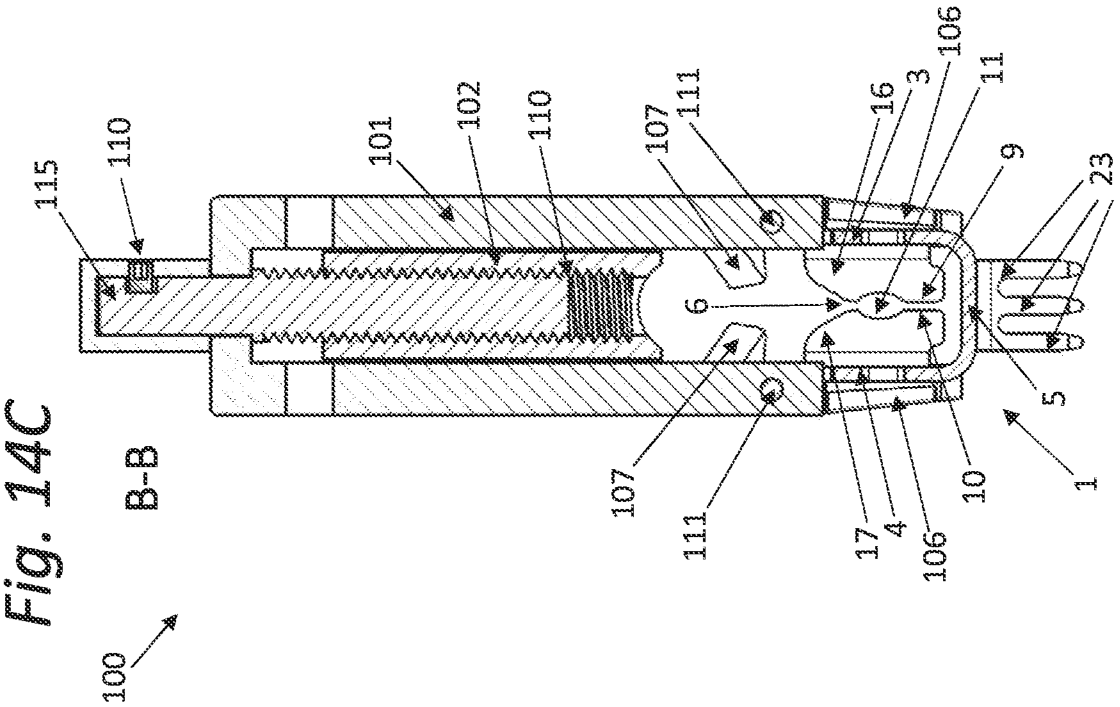
FIG. 14C, a further sectional view (section B-B in FIG. 14A) of the exemplary embodiment of the tool with a terminal shown in FIG. 14A.

FIG. 14C shows a further sectional view (section B-B in FIG. 14A) of the exemplary embodiment of the tool 100 with the terminal 1 shown in FIG. 14A.

The plunger element 115 comprises a hexagonal screw head which is arranged outside the guide frame 101, that is to say on the bar region of the guide frame 101, and is detachably fastened to a threaded spindle via a screw connection 110. The threaded spindle in turn forms a screw connection 110 with the slide unit 102. By rotating the hexagon screw head and therefore the threaded spindle of the plunger unit 115, this rotational movement is converted into a linear, i.e. translational movement of the slide unit 102. As already described above, the slide unit 102 is moveably mounted on the guide frame 101 and is correspondingly configured for guiding the electrical conductor 2 into the terminal 1 in order to form a connection, that is to say an electrically conductive connection.

FIG. 14D shows a perspective view of the plunger element 115 of the exemplary embodiment of the tool 100 shown in FIG. 3A.

The hexagon screw head for actuating or rotating the plunger element 115 is releasably fastened to the threaded spindle by means of a screw connection 110 in the form of a grub screw.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Terminal
2 Electrical conductor
3 First side wall section
4 Second side wall section
5 Bar
6 Terminal slot
7 First terminal element
8 Second terminal element
9 Projection
10 Projection
11 Connection section
12 Cutout
13 Cutout
14 Cutout
15 Cutout
16 Further first terminal element
17 Further second terminal element
18 Retaining element
19 Contact surface
20 Sheath
21 Filling insulation
22 Wire, single wire, stranded wire
23 Fastening plug
100 Tool
101 Guide frame
101A Projection
101B Shoulder
101C Chamfer, rounding
102 Slide unit
103 Locking element
103A Projection
104 Slot track
105 Slot track
106 Hook section
106A Rounding, chamfer
107 Cutting element
107A Cutout
108 Coil spring
110 Screw connection, screw
112 Conductor guide section
113 Projection
115 Plunger element
116 Stop element
117 Actuating element
AP Initial position of the electrical conductor (insertion position)
D4 Wall thickness of the second side wall section
EP End position of the electrical conductor (connection position)
X Direction/course of the electrical conductor in the terminal
Y Movement direction of the slide unit/plunger element

The invention claimed is:

1. A terminal for connecting an electrical conductor with a sheath, the terminal comprising:

a first side wall section and a second side wall section, which are arranged opposite one another and/or spaced apart from one another, wherein the first side wall section has a first terminal element and the second side wall section has a second terminal element which are assigned to one another in to form a terminal slot and are arranged at least sectionally at a distance from one another, and wherein the first side wall section has a cutout in its end face, at which the electrical conductor is guided on the terminal slot for connection to the terminal, which cutout is groove-shaped to at least sectionally receive in the cutout a tool placed on the terminal in a form-fitting manner.

2. The terminal of claim 1, wherein the cutout extends along a wall thickness of the first side wall section and/or along a wall thickness of the second side wall section.

3. The terminal of claim 1, wherein the cutout in the first and/or in the second side wall section has, in a view, at least sectionally, a funnel-shaped contour and/or a substantially arcuate and/or substantially round contour.

4. The terminal of claim 1, wherein the cutout in the first side wall section is arranged centered in relation to the first side wall section and/or the cutout in the second side wall section is arranged centered in relation to the second side wall section.

5. The terminal of claim 1, wherein the first terminal element and the second terminal element form at least one connection section for connecting the electrical conductor, and wherein the at least one connection section has a substantially round contour or a substantially oval contour in a view.

6. The terminal of claim 1, wherein the terminal slot has, in a view, at least sectionally, a substantially V-shaped contour.

7. The terminal of claim 1, wherein the first side wall section and the second side wall section are connected to one another via a common bar.

8. The terminal of claim 1, wherein the first side wall section and/or the first terminal element and/or the second side wall section and/or the second terminal element is at least partially plate-shaped and/or flat.

9. The terminal of claim 1, wherein the first side wall section comprises a further first terminal element and the second side wall section comprises a further second terminal element, which are assigned to one another to form a further terminal slot and are arranged at least sectionally spaced apart from one another.

10. The terminal of claim 1, wherein the first side wall section and/or the second side wall section has at least one retaining element to form an operative connection with a tool applied to the terminal on an end face opposite the end face with the cutout.

11. The terminal of claim 1, wherein the terminal comprises a metallic material.

12. A tool for producing a connection between an electrical conductor with a sheath to a terminal with at least one retaining element and at least one groove-shaped cutout in an end face on which the electrical conductor is guided to a terminal slot of the terminal for connection to the terminal, the tool comprising:

a guide frame configured and formed at least sectionally to contact the terminal; and a slide unit, which is movably mounted on the guide frame for guiding the electrical conductor into the terminal, wherein the guide frame has at least one locking element which is pivotally mounted, and the slide unit for actuating the at least one locking element is displaceably coupled to the at least one locking element to bring the at least one locking element into engagement with the at least one retaining element of the terminal at least sectionally during guidance of the electrical conductor into the terminal.

13. The tool of claim 12, wherein the guide frame has at least one spring-shaped or pin-like section in the contact region for at least sectionally contacting the terminal.

14. The tool of claim 12, wherein the slide unit is mounted displaceably on the guide frame by a slotted guide.

15. The tool of claim 12, wherein the at least one locking element has a hook section for at least sectionally grasping the terminal on the at least one retaining element.

16. The tool of claim 12, wherein the slide unit comprises an actuating element by which the slide unit is coupled to or with the at least one locking element.

17. The tool of claim 12, wherein a pivot axis of the at least one cutting element and a pivot axis of the at least one locking element lie substantially perpendicular to one another in a view.

18. The tool of claim 12, wherein the slide unit comprises at least one stop element for contacting the terminal.

19. The tool of claim 18, wherein the at least one stop element comprises a screw connection.

20. The tool of claim 12, wherein the guide frame has at least one shoulder, which forms a stop in the contact region for at least sectionally contacting the terminal.

21. The tool of claim 20, wherein the at least one shoulder has a chamfer or a rounding at least sectionally.

22. The tool of claim 12, wherein the guide frame has at least one cutting element configured to cut the sheath of the electrical conductor at least sectionally.

23. The tool of claim 22, wherein the at least one cutting element is mountable or pluggable onto a bearing pin, and wherein at least one cutout of the at least one cutting element is configured to receive a projection of the guide frame which sectionally supports the bearing pin.

24. The tool of claim 22, wherein the at least one cutting element is configured to be wedge-shaped or pyramid-shaped to push the sheath of the electrical conductor apart at the cut at the current location or at the cut region.

25. The tool of claim 22, wherein the at least one cutting element is acted upon by pretension, and/or is adjustably arranged.

26. A method for producing a connection between an electrical conductor with a sheath to a terminal with at least one terminal slot, at least one retaining element, and at least one groove-shaped cutout in an end face on which the electrical conductor is guided to the at least one terminal slot of the terminal for connection to the terminal, the method comprising:

placing or applying a tool on the terminal;

at least sectionally forming a form-fitting connection between the at least one groove-shaped cutout and the tool;

inserting the electrical conductor into the tool;

attaching at least one pivotably mounted locking element of the tool to the terminal by the slide unit and holding the terminal;

guiding the electrical conductor to and/or at least sectionally into a region of the at least one terminal slot by a slide unit of the tool; and guiding the electrical conductor into a region of a connection section of the at least one terminal slot and establishing the connection between the electrical conductor and the terminal.

27. The method of claim 26, further comprising:

guiding the electrical conductor to at least one cutting element of the tool by the slide unit; and at least sectionally cutting the sheath of the electrical conductor at a point to be connected to the terminal or a region to be connected to the terminal by the at least one cutting element.

28. The method of claim 27, further comprising:

pushing apart the sheath of the electrical conductor at the at least sectionally cut point or the at least a sectionally cut region cut by the at least one cutting element.

29. An assembly, comprising:

a terminal for connecting an electrical conductor with a sheath, the terminal comprising:

a first side wall section and a second side wall section, which are arranged opposite one another and/or spaced apart from one another, and at least one retaining element, wherein the first side wall section has a first terminal element and the second side wall section has a second terminal element which are assigned to one another to form a terminal slot and are arranged at least sectionally at a distance from one another, and wherein the first side wall section has a cutout in its end face, at which the electrical conductor is guided on the terminal slot for connection to the terminal, which cutout is groove-shaped to at least sectionally receive in the cutout a tool placed on the terminal in a form-fitting manner;

the tool for producing a connection between the electrical conductor with the sheath to the terminal, the tool comprising: a guide frame configured and formed at least sectionally to contact the terminal, and a slide unit, which is movably mounted on the guide frame for guiding the electrical conductor into the terminal, wherein the guide frame has at least one locking element which is pivotally mounted, and wherein the slide unit for actuating the at least one locking element is displaceably coupled to the at least one locking element to bring the at least one locking element into engagement with the at least one retaining element of the terminal at least sectionally during guidance of the electrical conductor into the terminal.

* * * * *